United States Patent
Gulati et al.

(10) Patent No.: US 11,832,238 B2
(45) Date of Patent: Nov. 28, 2023

(54) TECHNIQUES FOR COMMUNICATING SIDELINK TRANSMISSION TIMING

(71) Applicant: QUALCOMM Incorporated, San Diego, CA (US)

(72) Inventors: Kapil Gulati, Belle Mead, NJ (US); Junyi Li, Chester, NJ (US); Sony Akkarakaran, Poway, CA (US); Jung Ho Ryu, Fort Lee, NJ (US); Vasanthan Raghavan, West Windor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/012,626

(22) Filed: Sep. 4, 2020

(65) Prior Publication Data

US 2021/0084672 A1 Mar. 18, 2021

Related U.S. Application Data

(60) Provisional application No. 62/900,248, filed on Sep. 13, 2019.

(51) Int. Cl.
*H04W 72/12* (2023.01)
*H04W 72/1263* (2023.01)
(Continued)

(52) U.S. Cl.
CPC ...... *H04W 72/1263* (2013.01); *H04B 7/0695* (2013.01); *H04W 72/21* (2023.01); *H04W 72/23* (2023.01); *H04W 92/18* (2013.01)

(58) Field of Classification Search
CPC ....... H04W 92/18; H04W 76/14; H04W 4/40; H04W 72/0406; H04W 72/046;
(Continued)

(56) References Cited

U.S. PATENT DOCUMENTS

2019/0159156 A1   5/2019   Abedini et al.

FOREIGN PATENT DOCUMENTS

| EP | 2901777 A1 | 8/2015 | |
| WO | WO-2019036578 A1 * | 2/2019 | ............. G01S 19/46 |
| WO | WO-2020033088 A1 * | 2/2020 | ........... H04B 17/318 |

OTHER PUBLICATIONS

Ericsson et al., "Timing Advance Value Initialization", 3GPP Draft, 3GPP TSG-RAN WG2 #78, Tdoc R2-122584—Timing Advance Value Initialization, 3rd Generation Partnership Project (3GPP), Mobile Competence Centre, 650, Route Des Lucioles, F-06921 Sophia-Antipolis Cedex, France, vol. RAN WG2, No. Prague. Czech Republic, May 21, 2012-May 25, 2012, May 14, 2012 (May 14, 2012), XP050606976, pp. 1-3, [retrieved on May 14, 2012] Section 1 Section 2.

(Continued)

*Primary Examiner* — Khalid W Shaheed
(74) *Attorney, Agent, or Firm* — Dalei Dong; Holland & Hart LLP

(57) ABSTRACT

Methods, systems, and devices for wireless communications are described. A user equipment (UE) may transmit to a base station a request for resources including an indication of a transmission beam for performing a sidelink communication in a millimeter wave (mmW) system. The base station may determine a transmission configuration based on the request for resources. The UE may transmit reference signals based on the transmission configuration, and the base station may monitor for the reference signals using one or more reception beams. The base station may determine timing information for the sidelink communication, and transmit the timing information to the UE in a resource grant. Based on the timing information, the UE may perform the sidelink communication using the transmission beam. In some examples, the sidelink communication may be multiplexed (Continued)

in frequency from the perspective of the base station with an uplink transmission from another UE.

26 Claims, 21 Drawing Sheets

(51) Int. Cl.
*H04B 7/06* (2006.01)
*H04W 72/21* (2023.01)
*H04W 72/23* (2023.01)
*H04W 92/18* (2009.01)

(58) Field of Classification Search
CPC ..... H04W 16/28; H04W 72/02; H04W 72/04; H04W 4/46; H04W 72/0453; H04W 24/10; H04W 88/04
See application file for complete search history.

(56) References Cited

OTHER PUBLICATIONS

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600771, 4 pages, Retrieved from the Internet: URL: http://www.3gpp.org/ftp/tsg%5Fran/WG1%5FRL1/TSGR1%5F96/Docs/R1%2D1903075%2Ezip. [retrieved on Feb. 15, 2019] p. 2.

International Search Report and Written Opinion—PCT/US2020/049714—ISA/EPO—dated Dec. 21, 2020.

VIVO: "Enhancements of Uu Link to Control Sidelink", 3GPP Draft, 3GPP TSG RAN WG1 #96, R1-1901688, Enhancements of Uu Link to Control Sidelink, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599384, 8 pages, Retrieved from the Internet: URL: http://www.3gpp.org/ftp/tsg%5Fran/WG1%5FRL1/TSGR1%5F96/Docs/R1%2D1901688%2Ezip. [retrieved on Feb. 15, 2019] section 2.1, Section 2, figures 1, 2, 5.

VIVO: "Enhancements of Uu Link to Control Sidelink", 3GPP Draft, 3GPP TSG RAN WG1 Meeting #95, R1-1812310, Enhancements of Uu Link to Control Sidelink, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 3, 2018 (Nov. 3, 2018), XP051478499, 5 pages, Retrieved from the Internet: URL:http://www.3gpp.org/ftp/tsg%5Fran/WG1%5FRL1/TSGR1%5F95/Docs/R1%2D1812310%2Ezip [retrieved on Nov. 3, 2018] Section 2, Section 4, figures 1. 2, 3.

\* cited by examiner

TECHNIQUES FOR COMMUNICATING SIDELINK TRANSMISSION TIMING

CROSS REFERENCE

The present Application for Patent claims the benefit of U.S. Provisional Patent Application No. 62/900,248 by GULATI et al., entitled "TECHNIQUES FOR COMMUNICATING SIDELINK TRANSMISSION TIMING," filed Sep. 13, 2019, assigned to the assignee hereof, and expressly incorporated by reference herein.

FIELD OF DISCLOSURE

The present disclosure, for example, relates to wireless communications systems, and more specifically to techniques for communicating sidelink transmission timing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs may communicate directly with one another without transmitting through a base station or through a relay point. This communication may be referred to as sidelink, device-to-device (D2D), vehicle-to-everything (V2X) communications, or another term for sidelink communications. As demand for transmission efficiency increases, sidelink communications at a first UE may be multiplexed with uplink transmissions from a second UE to a base station. Some wireless communications systems may fail to provide improved scheduling for sidelink communications, and therefore improved techniques are desired.

SUMMARY

The described techniques relate to improved methods, systems, devices, and apparatuses that support techniques for communicating sidelink transmission timing for a user equipment (UE), and more particularly a sidelink transmission scheduling scheme that supports reconfiguring a timing of sidelink transmissions according to scheduled uplink transmissions. A UE may transmit to a base station a request for resources for performing the sidelink communication. The request for resources may include an indication of a transmission beam for performing the sidelink communication. In some examples, the UE may transmit the request for resources as part of sidelink information data sent to the base station. The base station may determine a transmission configuration based on the request for resources and indicate the transmission configuration to the UE. The UE may transmit reference signals based on the transmission configuration, and the base station may monitor for the reference signals using one or more reception beams. The base station may determine timing information for the sidelink communication based on monitoring for the reference signals. The base station may transmit the timing information to the UE in a resource grant. Based on the timing information, the UE may perform the sidelink communication using the transmission beam. In some examples, the sidelink communication may be multiplexed (e.g., from the perspective of the base station) with an uplink transmission from another UE, for example using a frequency division multiplexing scheme as configured by the base station.

A method of wireless communications is described. The method may include identifying, at a UE, a transmission beam for a sidelink communication, transmitting a request for resources corresponding to the transmission beam, the request including an indication of the transmission beam, receiving a resource grant indicating timing information associated with the transmission beam, and performing the sidelink communication using the transmission beam based on the timing information.

An apparatus for wireless communications is described. The apparatus may include a processor, memory coupled with the processor, and instructions stored in the memory. The instructions may be executable by the processor to cause the apparatus to identify, at a UE, a transmission beam for a sidelink communication, transmit a request for resources corresponding to the transmission beam, the request including an indication of the transmission beam, receive a resource grant indicating timing information associated with the transmission beam, and perform the sidelink communication using the transmission beam based on the timing information.

Another apparatus for wireless communications is described. The apparatus may include means for identifying, at a UE, a transmission beam for a sidelink communication, transmitting a request for resources corresponding to the transmission beam, the request including an indication of the transmission beam, receiving a resource grant indicating timing information associated with the transmission beam, and performing the sidelink communication using the transmission beam based on the timing information.

A non-transitory computer-readable medium storing code for wireless communications is described. The code may include instructions executable by a processor to identify, at a UE, a transmission beam for a sidelink communication, transmit a request for resources corresponding to the transmission beam, the request including an indication of the transmission beam, receive a resource grant indicating timing information associated with the transmission beam, and perform the sidelink communication using the transmission beam based on the timing information.

Some examples of the method, apparatuses, and non-transitory computer-readable medium described herein may further include operations, features, means, or instructions for transmitting sidelink information data, where the sidelink information data may include the request for resources.

Some examples of the method, apparatuses, and non-transitory computer-readable medium described herein may further include operations, features, means, or instructions for receiving a transmission configuration for a reference signal corresponding to the identified transmission beam, and transmitting the reference signal using the transmission beam based on the transmission configuration. In some examples of the method, apparatuses, and non-transitory computer-readable medium described herein, the resource grant may be based on the reference signal. In some examples of the method, apparatuses, and non-transitory computer-readable medium described herein, transmitting the reference signal may include operations, features, means, or instructions for transmitting the reference signal during one or more symbols or slots based on the transmission configuration.

In some examples of the method, apparatuses, and non-transitory computer-readable medium described herein, transmitting the reference signal may include operations, features, means, or instructions for transmitting the reference signal based on a timing associated with downlink transmissions. In some examples of the method, apparatuses, and non-transitory computer-readable medium described herein, the reference signal may include a sounding reference signal (SRS).

In some examples of the method, apparatuses, and non-transitory computer-readable medium described herein, the transmission configuration may include a periodic reference signal configuration, an aperiodic reference signal configuration, a semi-persistent reference signal configuration, or a combination thereof.

In some examples of the method, apparatuses, and non-transitory computer-readable medium described herein, receiving the resource grant may include operations, features, means, or instructions for receiving the resource grant in downlink control information (DCI) signaling or a medium access control (MAC) control element (MAC-CE).

In some examples of the method, apparatuses, and non-transitory computer-readable medium described herein, the timing information may include a timing advance (TA) value. In some examples of the method, apparatuses, and non-transitory computer-readable medium described herein, the TA value may correspond to a reception beam. Some examples of the method, apparatuses, and non-transitory computer-readable medium described herein may further include operations, features, means, or instructions for receiving an indication of one or more TA values, where each TA value may be associated with a reception beam of one or more reception beams.

In some examples of the method, apparatuses, and non-transitory computer-readable medium described herein, the resource grant may include an indication of an index associated with the TA value. In some examples of the method, apparatuses, and non-transitory computer-readable medium described herein, the TA value may be zero. In some examples of the method, apparatuses, and non-transitory computer-readable medium described herein, the resource grant may lack explicit signaling of the TA value. Some examples of the method, apparatuses, and non-transitory computer-readable medium described herein may further include operations, features, means, or instructions for determining the TA value may be zero based on the lack of explicit signaling in the resource grant.

Some examples of the method, apparatuses, and non-transitory computer-readable medium described herein may further include operations, features, means, or instructions for receiving a second resource grant indicating a second TA value, and performing the sidelink communication based on a sum of the TA value and the second TA value.

In some examples of the method, apparatuses, and non-transitory computer-readable medium described herein, the indication of the transmission beam may include an index.

In some examples of the method, apparatuses, and non-transitory computer-readable medium described herein, the request for resources may include a request for a dynamic resource, a request for semi-persistent resources, or a combination thereof. In some examples of the method, apparatuses, and non-transitory computer-readable medium described herein, the resource grant may indicate resources for performing the sidelink communication. In some examples of the method, apparatuses, and non-transitory computer-readable medium described herein, the sidelink communication may include a communication from the UE to a receiving device.

A method of wireless communications is described. The method may include receiving, at a base station, a request from a UE for resources corresponding to a transmission beam for a sidelink communication, the request including an indication of the transmission beam, determining timing information associated with the transmission beam and a reception beam at the base station, and transmitting a resource grant to the UE indicating the timing information.

An apparatus for wireless communications is described. The apparatus may include a processor, memory coupled with the processor, and instructions stored in the memory. The instructions may be executable by the processor to cause the apparatus to receive, at a base station, a request from a UE for resources corresponding to a transmission beam for a sidelink communication, the request including an indication of the transmission beam, determine timing information associated with the transmission beam and a reception beam at the base station, and transmit a resource grant to the UE indicating the timing information.

Another apparatus for wireless communications is described. The apparatus may include means for receiving, at a base station, a request from a UE for resources corresponding to a transmission beam for a sidelink communication, the request including an indication of the transmission beam, determining timing information associated with the transmission beam and a reception beam at the base station, and transmitting a resource grant to the UE indicating the timing information.

A non-transitory computer-readable medium storing code for wireless communications is described. The code may include instructions executable by a processor to receive, at a base station, a request from a UE for resources corresponding to a transmission beam for a sidelink communication, the request including an indication of the transmission beam, determine timing information associated with the transmission beam and a reception beam at the base station, and transmit a resource grant to the UE indicating the timing information.

Some examples of the method, apparatuses, and non-transitory computer-readable medium described herein may further include operations, features, means, or instructions for receiving sidelink information data, where the sidelink information data may include the request for resources.

In some examples of the method, apparatuses, and non-transitory computer-readable medium described herein, determining the timing information may include operations, features, means, or instructions for scheduling the sidelink communication based on uplink transmissions from a second UE received using the reception beam.

In some examples of the method, apparatuses, and non-transitory computer-readable medium described herein, transmitting the resource grant may include operations, features, means, or instructions for transmitting the resource grant in DCI signaling or a MAC-CE.

Some examples of the method, apparatuses, and non-transitory computer-readable medium described herein may further include operations, features, means, or instructions for determining a transmission configuration for the reception beam and a reference signal corresponding to the transmission beam, transmitting the transmission configuration to the UE, and monitoring for the reference signal using the reception beam based on the transmission configuration, where determining the timing information may be based on the monitoring.

In some examples of the method, apparatuses, and non-transitory computer-readable medium described herein, determining the transmission configuration may include operations, features, means, or instructions for configuring the UE to transmit the reference signal during one or more symbols or slots.

Some examples of the method, apparatuses, and non-transitory computer-readable medium described herein may further include operations, features, means, or instructions for monitoring for the reference signal using the reception beam during a first symbol or slot, and monitoring for the reference signal using a second reception beam during a second symbol or slot.

Some examples of the method, apparatuses, and non-transitory computer-readable medium described herein may further include operations, features, means, or instructions for measuring a time delay associated with the reference signal and the reception beam, and determining a TA value based on the time delay, where the timing information may include the TA value.

In some examples of the method, apparatuses, and non-transitory computer-readable medium described herein, determining the timing information further may include operations, features, means, or instructions for determining one or more TA values, where each TA value may be associated with a reception beam of one or more reception beams.

Some examples of the method, apparatuses, and non-transitory computer-readable medium described herein may further include operations, features, means, or instructions for transmitting an indication of the TA values in the resource grant. In some examples of the method, apparatuses, and non-transitory computer-readable medium described herein, the resource grant may include an indication of an index associated with the TA value. In some examples of the method, apparatuses, and non-transitory computer-readable medium described herein, determining the timing information further may include operations, features, means, or instructions for determining the TA value may be zero. In some examples of the method, apparatuses, and non-transitory computer-readable medium described herein, the resource grant may lack explicit signaling of the TA value.

Some examples of the method, apparatuses, and non-transitory computer-readable medium described herein may further include operations, features, means, or instructions for determining an absence of the reference signal based on the monitoring, and determining the TA value may be zero based on the absence of the reference signal.

In some examples of the method, apparatuses, and non-transitory computer-readable medium described herein, the reference signal may include an SRS. In some examples of the method, apparatuses, and non-transitory computer-readable medium described herein, the transmission configuration may include a periodic reference signal configuration, an aperiodic reference signal configuration, a semi-persistent reference signal configuration, or a combination thereof.

In some examples of the method, apparatuses, and non-transitory computer-readable medium described herein, determining the timing information may include operations, features, means, or instructions for determining the timing information based on a spatial configuration of the reception beam. In some examples of the method, apparatuses, and non-transitory computer-readable medium described herein, the indication of the transmission beam may include an index.

In some examples of the method, apparatuses, and non-transitory computer-readable medium described herein, the request for resources may include a request for a dynamic resource, a request for semi-persistent resources, or a combination thereof. In some examples of the method, apparatuses, and non-transitory computer-readable medium described herein, the resource grant may include an indication of an index associated with the timing information. In some examples of the method, apparatuses, and non-transitory computer-readable medium described herein, the resource grant may indicate resources for performing the sidelink communication.

DETAILED DESCRIPTION

Figure 1:
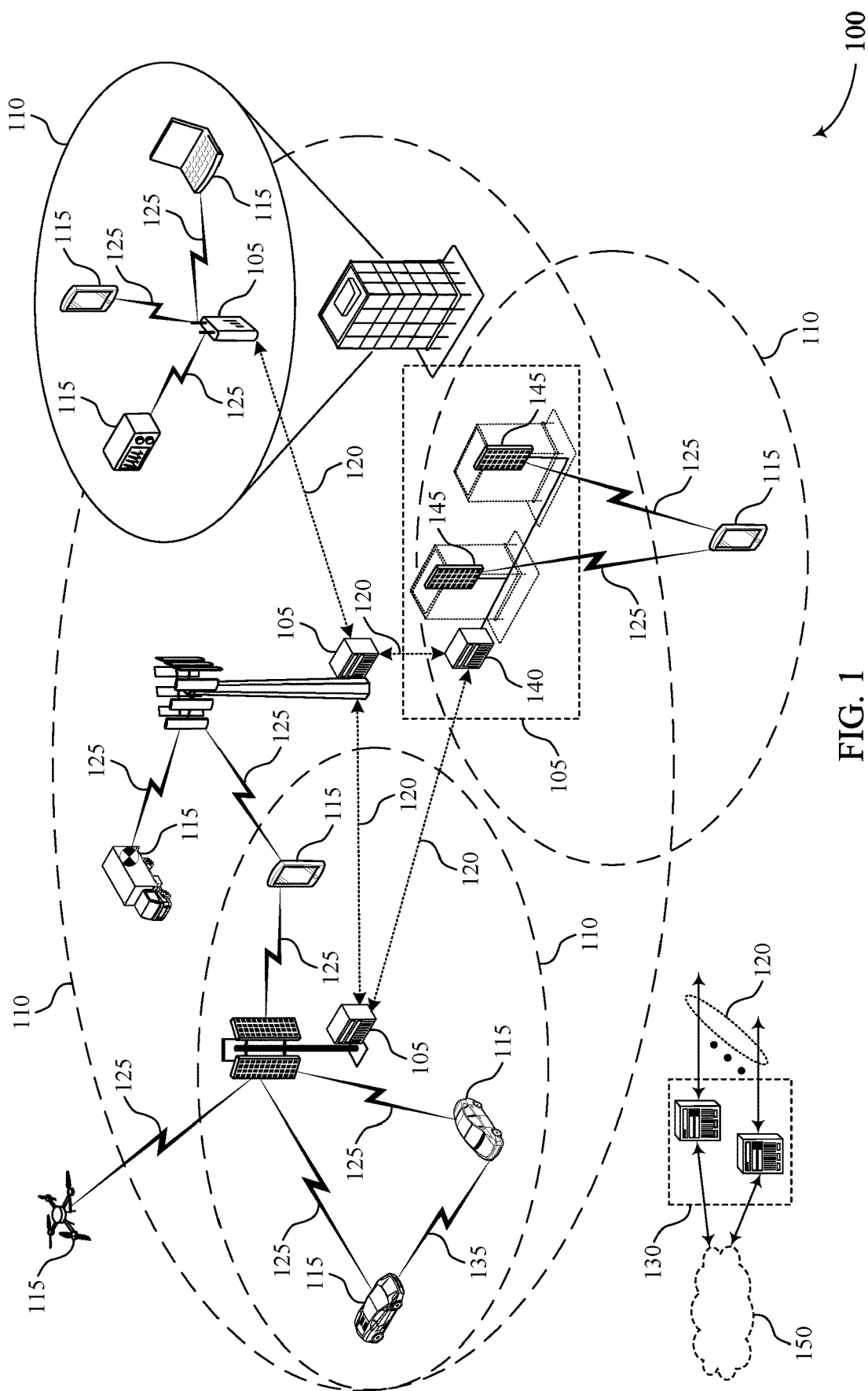
FIGS. 1 through 3 illustrate examples of a wireless communications system that supports techniques for communicating sidelink transmission timing in accordance with various aspects of the present disclosure.

Some wireless communication systems may have one or more user equipments (UEs) and one or more base stations, for example, next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). According to one or more of these example radio access technologies (RATs), one or more UEs may communicate directly with one another in sidelink communication channels without transmitting through a base station or through a relay point. A sidelink communication may be an example of device-to-device (D2D) communication, vehicle-to-everything (V2X) communication, or another example of sidelink communication in a wireless communications system. As demand for transmission efficiency increases, it may be desirable for UEs and base stations to support capabilities for improved transmission management that may promote enhanced transmission multiplexing for UEs and base stations, and reduce latency in wireless communications systems.

As described herein, a base station may support sidelink transmission scheduling schemes, and more particularly a sidelink transmission scheduling scheme that supports reconfiguring a timing of sidelink transmissions according to scheduled uplink transmissions. A UE may identify a transmission beam for a sidelink communication with a second UE. The UE may transmit a request for resources to a scheduling device, such as a base station. The base station may determine to multiplex the sidelink communication with uplink transmissions from a third UE, for example using frequency division multiplexing (FDM) or time division multiplexing (TDM). The third UE may transmit the uplink transmissions using a timing granted by the base station. In some cases, the timing of the uplink transmissions and the timing of the sidelink communication may be misaligned, where there may be a difference between the symbol boundaries of the uplink transmissions and the sidelink communication. This misalignment may result in interference (e.g., inter-cell interference (ICI)) at the base station, which may degrade the reliability and efficiency of the base station receiving the uplink transmissions.

The base station may indicate uplink transmission timing to a UE based on a timing advance (TA) value. The UE may receive the TA value while in a radio resource control (RRC) connected state. In some examples, such as in a millimeter wave (mmW) communications system, the TA value may be dependent on a transmission beam of the UE and a reception beam of the base station. For example, the TA value may be dependent on a spatial configuration of the transmission beam and the reception beam. The UE may separately identify a transmission beam for a sidelink communication with another UE, which may not be the same as the transmission beam for uplink transmissions to the base station. Accordingly, the TA value indicated for uplink transmissions from another UE may not be the same as a TA value for the sidelink communication.

In some cases, the base station may detect a sidelink communication using a reception beam configured for receiving an uplink transmission. If the TA values of the sidelink communication and the uplink transmission are misaligned, the sidelink communication may interfere with the base station receiving the uplink transmission, which may result in wasted resources at the base station and at the UE transmitting the uplink transmission. It is therefore desirable to determine timing information for the sidelink communication based on the reception beam of the base station as well as the transmission beam for the sidelink communication.

Techniques are described herein which may enable a UE and a base station to determine timing information for a sidelink communication, while avoiding interference with a multiplexed uplink transmission. The UE may identify a transmission beam for performing the sidelink communication, or identify one or more potential transmission beams. The UE may transmit a request for resources (e.g., time and frequency resources) to the base station, which may determine scheduling for transmissions within a geographic coverage area. The request for resources may include an indication of the transmission beam (or the potential transmission beams) the UE intends to use for performing the sidelink communication. The indication may include a spatial configuration of the transmission beam, or an index associated with the transmission beam, or a combination thereof. In some examples, the UE may transmit the request for resources as part of sidelink information data (e.g., a SidelinkUEInformation message) sent to the base station.

The base station may determine a transmission configuration for the UE based on the request for resources. For example, the base station may configure the UE to transmit a reference signal (e.g., a sounding reference signal (SRS) or another uplink reference signal) using the transmission beam indicated in the request for resources. The base station may transmit the transmission configuration to the UE, and monitor for the reference signal using a reception beam. In some examples, the reception beam may be configured for receiving uplink transmissions from a second UE. In some examples, the base station may configure the UE to transmit the reference signal in multiple slots or symbols, and the base station may monitor for the reference signal using multiple reception beams.

The UE may transmit the reference signal (or reference signals) using the transmission beam based on the transmission configuration from the base station. In some examples, the UE may transmit the reference signal based on a downlink transmission timing (e.g., based on a TA value of zero). Based on monitoring for the reference signal, the base station may determine timing information (e.g., a TA value) associated with the reception beam and the transmission beam. For example, the base station may measure a time delay associated with receiving the reference signal using the reception beam, and determine the TA value based on the time delay. In some examples, the base station may determine (e.g., compute) a TA value associated with each reception beam used for monitoring for the reference signal. The base station may determine the TA value such that when the sidelink communication is multiplexed with an uplink transmission received using the reception beam, the interference at the base station between the sidelink communication and the uplink transmission may be reduced or eliminated, which may improve the reliability of the base station receiving the uplink transmission.

The base station may inform the UE of the TA value (or TA values) corresponding to the transmission beam. In some examples, the base station may inform the UE of TA values corresponding to each of the potential transmission beams for performing the sidelink communication. The base station may inform the UE of the TA value in a resource grant scheduling the sidelink communication. In some examples, the base station may transmit the resource grant in downlink control information (DCI) signaling, or in a medium access control (MAC) control element (MAC-CE). The resource grant may include the resources granted for the UE to perform the sidelink communication. Based on the timing information received from the base station, the UE may perform the sidelink communication using the transmission beam according to the TA value corresponding to the transmission beam.

In some examples, the base station may determine the base station is unable to measure the reference signal using the reception beam based on monitoring for the reference signal. The base station may determine the combination of the reception beam and the transmission beam for performing the sidelink communication results in low interference at the base station. The base station may determine that no adjustment is needed for the TA value associated with the transmission beam. For example, the base station may determine the UE may use a TA value of zero when performing the sidelink communication. In some examples, the base station may determine not to include explicit signaling of the TA value when no adjustment is needed, in order to reduce signaling overhead. If the UE determines the resource grant lacks explicit signaling of the TA value, the UE may assume the TA value used for transmitting the reference signals (e.g., a TA value of zero) is to be used for performing the sidelink communication.

In some examples, the TA values indicated by the base station may be accumulative. For example, a UE may receive a first TA value in response to a first request for resources for a first sidelink communication as described herein. Subsequently, the UE may transmit a second request for resources for a second sidelink communication, and receive a second TA value in a resource grant for the second sidelink communication. The UE may then perform the second sidelink communication using a TA value corresponding to a sum of the first TA value and the second TA value, rather than using the second TA value.

Particular aspects of the subject matter described herein may be implemented to realize one or more advantages. The described techniques may support improvements in power savings, among other advantages. As such, supported techniques may include improved UE operations and, in some examples, may promote UE efficiencies, among other benefits. Aspects of the disclosure are initially described in the context of wireless communications systems. An additional example of a process flow is then discussed. Aspects of the disclosure are further illustrated by and described with reference to apparatus diagrams, system diagrams, and flowcharts that relate to techniques for communicating sidelink transmission timing.

FIG. 1 illustrates an example of a wireless communications system 100 that supports techniques for communicating sidelink transmission timing in accordance with various aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may identify a transmission beam for performing a sidelink communication. The UE 115 may transmit to a base station 105 (e.g., a gNB in an NR system) a request for resources for performing the sidelink communication. The request for resources may include an indication of the transmission beam (e.g., a spatial configuration of the transmission beam, or an index associated with the transmission beam). In some examples, the UE 115 may transmit the request for resources as part of sidelink information data (e.g., a SidelinkUEInformation message) sent to the base station 105. The base station 105 may transmit a resource grant to the UE 115 including timing information for performing the sidelink communication.

The base station 105 may determine the timing information for the sidelink communication based on a reference signal transmitted by the UE 115 using the transmission beam. The base station 105 may determine a transmission configuration for the reference signal based on the request for resources and indicate the transmission configuration to the UE 115. The UE 115 may transmit the reference signal, and the base station 105 may monitor for the reference signal, based on the transmission configuration. The base station 105 may measure a time delay associated with the reference signal, and determine the timing information (e.g., a TA value) based on the time delay. The base station 105 may indicate the TA value corresponding to the transmission beam in the resource grant transmitted to the UE 115. Based on the timing information, the UE 115 may perform the sidelink communication using the transmission beam, where the sidelink communication may be multiplexed (e.g., from the perspective of the wireless communications system 100) with an uplink transmission from a second UE 115, for example using an FDM scheme as configured by the base station 105. The wireless communications system 100 may therefore include features for improved power savings and, in some examples, may promote improved sidelink transmission timing, among other benefits.

Figure 2:
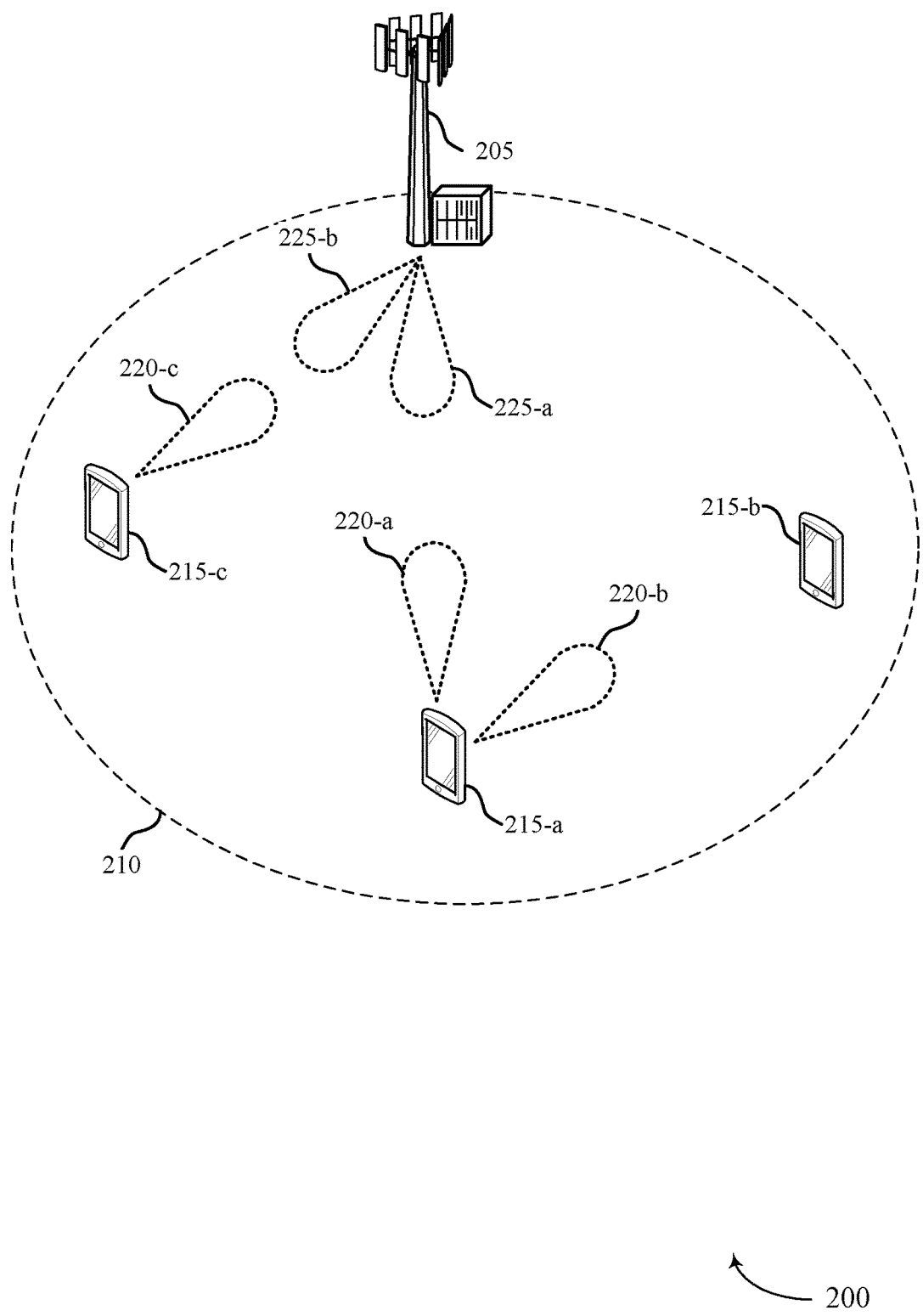

FIG. 2 illustrates an example of a wireless communications system 200 that supports techniques for communicating sidelink transmission timing in accordance with various aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The wireless communications system 200 may include features for improved UE operations and, in some examples, may promote higher UE efficiencies, among other benefits.

In the wireless communications system 200, the base station 205 may provide a geographic coverage area 210. UEs 215 within the geographic coverage area 210 may transmit and receive communications as scheduled by the base station 205. Devices in the wireless communications system 200 may use beamforming techniques to transmit using transmission beams 220, and receive transmissions using reception beams 225. As illustrated in FIG. 2, the UE 215-a may transmit uplink transmissions to the base station 205 using the transmission beam 220-a. The UE 215-a may also transmit sidelink communications to the UE 215-b using the transmission beam 220-b, and the UE 215-c may transmit uplink transmissions to the base station 205 using the transmission beam 220-c. The base station 205 may receive transmissions from the UEs 215 using the reception beams 225-a and 225-b.

The UE 215-a may transmit a request for resources to the base station 205 for transmitting a sidelink communication to the UE 215-b using the transmission beam 220-b. The request for resources may include an indication of the transmission beam 220-b (e.g., a spatial configuration for the transmission beam 220-b or an index associated with the transmission beam 220-b). In some examples, the UE 215-a may transmit the request for resources as part of sidelink information data (e.g., a SidelinkUEInformation message)

sent to the base station 205. In some examples, the request for resources may include a request for a dynamic resource, a request for semi-persistent resources, or a combination thereof.

The base station 205 may determine to multiplex the sidelink communication from the UE 215-*a* with an uplink transmission from the UE 215-*c*. To avoid a timing misalignment, the base station 205 may determine a transmission configuration for the UE 215-*a* based on receiving the request for resources. The base station 205 may configure the UE 215-*a* to transmit a reference signal (e.g., an SRS or another uplink reference signal) using the transmission beam 220-*b*. In some examples, the transmission configuration may be periodic, aperiodic, or semi-persistent. The base station 205 may transmit the transmission configuration to the UE 215-*a*, and monitor for the reference signal using a reception beam 225, such as the reception beam 225-*b*.

The UE 215-*a* may transmit the reference signal using the transmission beam 220-*b*. In some examples, the UE 215-*a* may transmit the reference signal based on a downlink transmission timing (e.g., based on a TA value of zero). Based on monitoring for the reference signal using the reception beam 225-*b*, the base station 205 may determine timing information (e.g., a TA value) associated with the reception beam 225-*b* and the transmission beam 220-*b*. For example, the base station 205 may measure a time delay associated with receiving the reference signal using the reception beam 225-*b*, and determine the TA value based on the time delay. The base station 205 may determine the TA value such that when the sidelink communication is multiplexed with an uplink transmission received using the reception beam 225-*b*, the interference at the base station 205 between the sidelink communication from the UE 215-*a* and the uplink transmission from the UE 215-*c* may be reduced or eliminated, which may improve the reliability of the base station receiving the uplink transmission.

In some examples, the base station 205 may configure the UE 215-*a* to transmit the reference signal using multiple slots or symbols, and the base station may in turn monitor for the reference signal using multiple reception beam 225 (e.g., reception beam 225-*a* and reception beam 225-*b*). The base station 205 may schedule the sidelink communication from the UE 215-*a* to be multiplexed with uplink transmissions from another UE 215 (e.g., the UE 215-*c*), and so the base station 205 may wish to determine timing information for multiple reception beams 225 to determine which uplink transmissions of which UE 215 to multiplex with the sidelink communication from the UE 215-*a*. The base station 205 may determine a TA value associated with each reception beam 225 used for monitoring for the reference signal. It may involve too much overhead for the base station 205 and the UE 215-*a* to measure reference signals using each possible reception beam 225 at the base station 205, and so the base station 205 may determine instead to measure reference signals using a subset of the possible reception beams 225 and then intelligently schedule the sidelink communication to be multiplexed with uplink transmissions from a UE 215 (e.g., the UE 215-*c*) based on the measured reference signals. In some examples, the base station 205 may use a TA value associated with a first reception beam 225 for a second reception beam 225 which may have a similar spatial configuration (e.g., if the first reception beam 225 is close by the second reception beam 225).

The base station 205 may inform the UE 215-*a* of the TA value (or TA values) corresponding to the transmission beam 220-*b*. The base station 205 may inform the UE 215-*a* of the TA value in a resource grant scheduling the sidelink communication. The resource grant may include the resources (e.g., the time and frequency resources) granted for the UE 215-*a* to perform the sidelink communication. Based on the timing information received from the base station 205, the UE 215-*a* may perform the sidelink communication using the transmission beam 220-*b* according to the TA value corresponding to the transmission beam 220-*b*. In some examples, the sidelink communication may be multiplexed (e.g., from the perspective of the wireless communications system 200 or the base station 205) with an uplink transmission from the UE 215-*c*, for example using an FDM scheme as configured by the base station 205.

In some examples, the base station 205 may determine the base station 205 is unable to measure the reference signal using the reception beam 225-*b* based on monitoring for the reference signal. The base station 205 may determine the combination of the reception beam 225-*b* and the transmission beam 220-*b* results in low interference at the base station 205. The base station 205 may determine that no adjustment is needed for the TA value associated with the transmission beam 220-*b*. For example, the base station 205 may determine the UE 215-*a* may use a TA value of zero when performing the sidelink communication. In some examples, the base station 205 may determine not to include explicit signaling of the TA value when no adjustment is needed, in order to reduce signaling overhead. If the UE 215-*a* determines the resource grant lacks explicit signaling of the TA value, the UE 215-*a* may assume the TA value used for transmitting the reference signals (e.g., a TA value of zero) is to be used for performing the sidelink communication.

Figure 3:
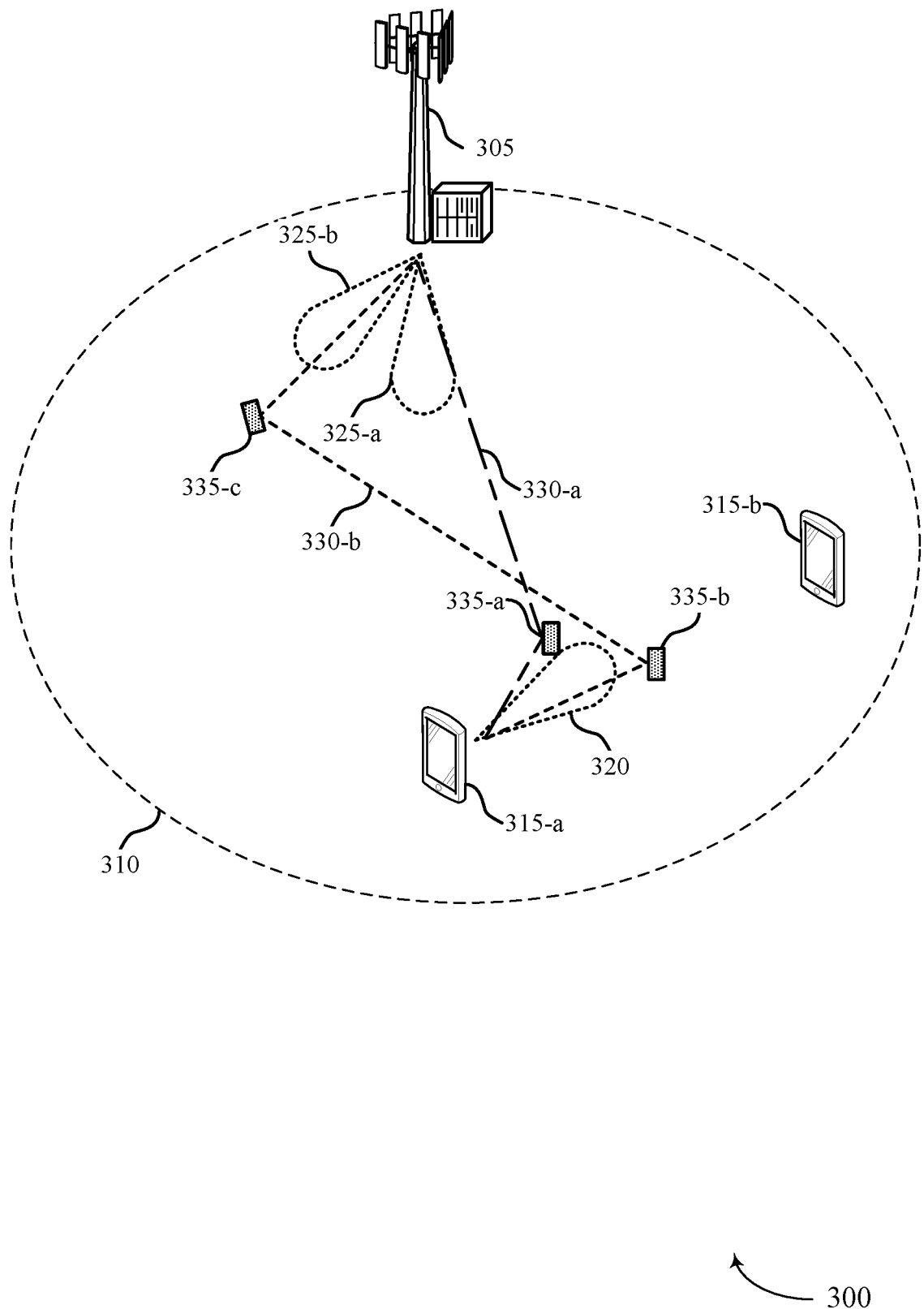

FIG. 3 illustrates an example of a wireless communications system 300 that supports techniques for communicating sidelink transmission timing in accordance with various aspects of the present disclosure. In some examples, the wireless communications system 300 may implement aspects of the wireless communications systems 100 and 200. For example, the wireless communications system 300 may include a base station 305 and a UE 315, which may be examples of the corresponding devices described with reference to FIGS. 1 and 2. The wireless communications system 300 may include features for improved UE operations and, in some examples, may promote higher UE efficiencies, among other benefits.

In the wireless communications system 300, the base station 305 may provide a geographic coverage area 310. UEs 315 within the geographic coverage area 310 may transmit and receive communications as scheduled by the base station 305. The UE 315-*a* may use beamforming techniques to transmit communications using the transmission beam 320, and the base station 305 may receive transmissions from the UEs 315 using reception beams 325.

The UE 315-*a* may transmit a request for resources to the base station 305 for transmitting a sidelink communication to the UE 315-*b* using the transmission beam 320. The request for resources may include an indication of the transmission beam 320 (e.g., a spatial configuration for the transmission beam 320 or an index associated with the transmission beam 320). In some examples, the UE 315-*a* may transmit the request for resources as part of sidelink information data (e.g., a SidelinkUEInformation message) sent to the base station 305.

The base station 305 may determine to multiplex the sidelink communication from the UE 315-*a* with an uplink transmission from another UE 315 (not shown). To avoid a timing misalignment, the base station 305 may determine a transmission configuration for the UE 315-*a* based on receiving the request for resources. In some examples, the transmission configuration may be periodic, aperiodic, or semi-persistent. In the example illustrated in FIG. 3, the base station 305 may configure the UE 315-a to transmit a reference signal (e.g., an SRS or another uplink reference signal) using the transmission beam 320 in multiple symbols or slots. The base station 305 may transmit the transmission configuration to the UE 315-a, and monitor for the reference signal using the reception beam 325-a and the reception beam 325-b.

The UE 315-a may transmit the reference signal using the transmission beam 320 based on the transmission configuration from the base station 305. As illustrated in FIG. 3, a first reference signal transmitted in a first symbol or slot may be detected at the base station 305 after following a path 330-a, which includes a reflection 335-a. The base station 305 may monitor for the first reference signal using the reception beam 325-a, and measure a first time delay to determine a first TA value associated with the reception beam 325-a and the transmission beam 320. Similarly, a second reference signal (which may be a repetition of the first reference signal) transmitted in a second symbol or slot may be detected at the base station 305 after following a path 330-b, which includes a first reflection 335-b and a second reflection 335-c. The base station 305 may monitor for the second reference signal using the reception beam 325-b, and measure a second time delay to determine a second TA value associated with the reception beam 325-b and the transmission beam 320. The base station 305 may determine the first TA value and the second TA value such that when the sidelink communication is multiplexed with an uplink transmission received using the reception beam 325-a or the reception beam 325-b, respectively, the interference at the base station 305 between the sidelink communication from the UE 315-a and the uplink transmission from another UE 315 (not shown) may be reduced or eliminated, which may improve the reliability of the base station receiving the uplink transmission.

The base station 305 may determine a TA value associated with each reception beam 325 used for monitoring for the reference signal. Determining a TA value associated with each reception beam 325 may involve too much overhead for the base station 305 and the UE 315-a due to measuring reference signals using each possible reception beam 325 at the base station 305, and so the base station 305 may determine instead to measure reference signals using a subset (e.g., the reception beam 325-a and the reception beam 325-b) of the possible reception beams 325 and then intelligently schedule the sidelink communication to be multiplexed with uplink transmissions from another UE 315 (not shown) based on the measured reference signals. In some examples, the base station 305 may use a TA value associated with a first reception beam 325 (e.g., the reception beam 325-a) for a second reception beam 325 (not shown) which may have a similar spatial configuration (e.g., if the first reception beam 325 is close by the second reception beam 325).

The base station 305 may inform the UE 315-a of the TA values corresponding to the transmission beam 320 and the respective reception beams 325. The base station 305 may inform the UE 315-a of the TA values in a resource grant scheduling the sidelink communication. The resource grant may include the resources (e.g., the time and frequency resources) granted for the UE 315-a to perform the sidelink communication. Based on the timing information received from the base station 305, the UE 315-a may perform the sidelink communication using the transmission beam 320 using one of the TA values corresponding to the transmission beam 320 as indicated in the resource grant. In some examples, the sidelink communication may be multiplexed (e.g., from the perspective of the wireless communications system 300 or the base station 305) with an uplink transmission from another UE 315 (not shown), for example using an FDM scheme as configured by the base station 305.

Figure 4:
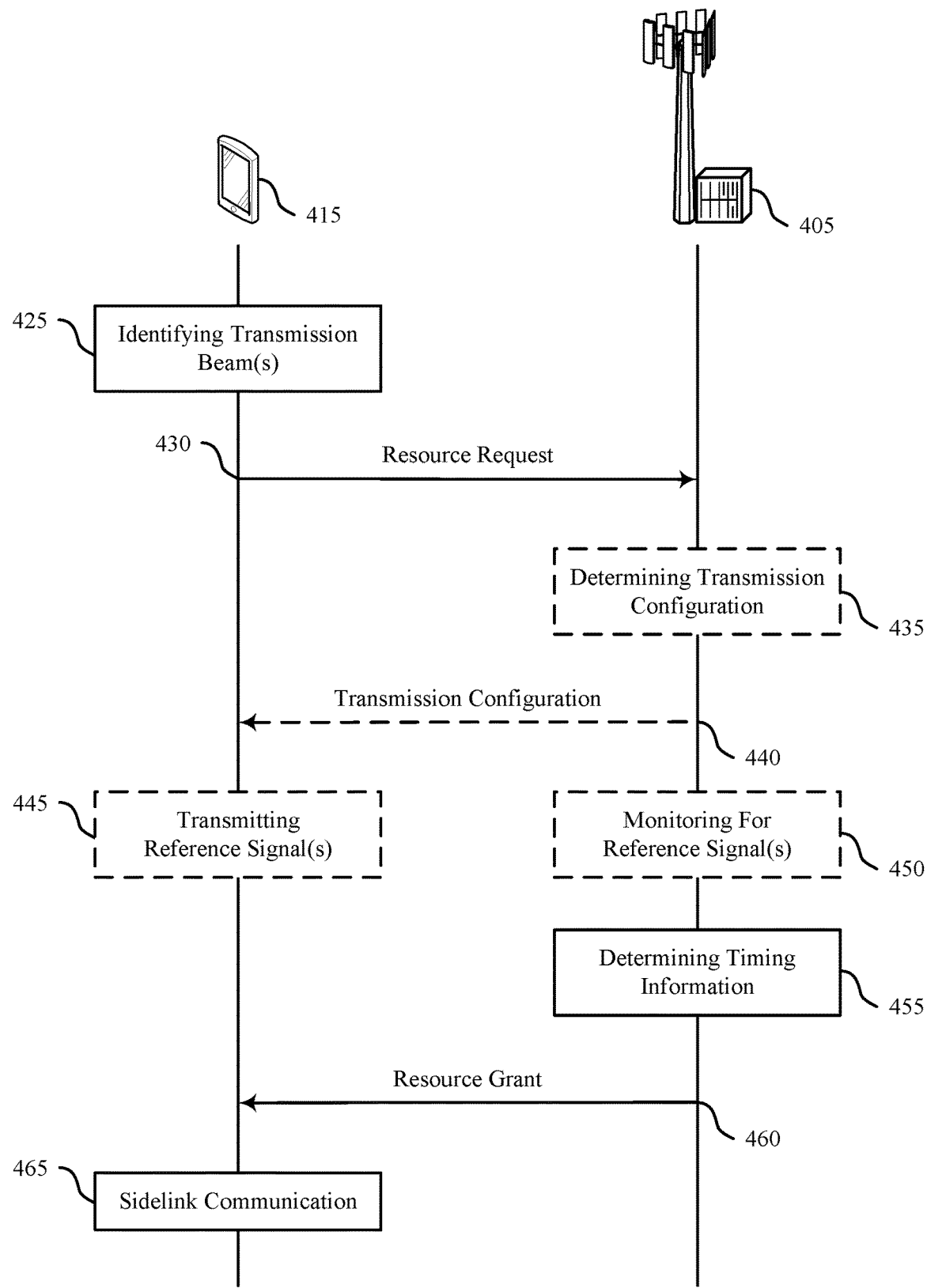
FIG. 4 illustrates an example of a process flow that supports techniques for communicating sidelink transmission timing in accordance with various aspects of the present disclosure.

FIG. 4 illustrates an example of a process flow 400 that supports techniques for communicating sidelink transmission timing in accordance with various aspects of the present disclosure. In some examples, the process flow 400 may implement aspects of the wireless communications systems 100, 200, and 300, as described with reference to FIGS. 1, 2, and 3. For example, the process flow 400 may include a base station 405 and a UE 415, which may be examples of the corresponding devices described with reference to FIGS. 1, 2, and 3. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400. The operations performed by the base station 405 and the UE 415 may support improvements to the UE 415 sidelink communication operations and, in some examples, may promote improvements to the UE 415 reliability, among other benefits.

At 425, the UE 415 may identify a transmission beam for performing a sidelink communication. In some examples, the UE 415 may identify one or more potential transmission beams.

At 430, the UE 415 may transmit a request for resources (e.g., time and frequency resources) for performing the sidelink communication to the base station 405. The request for resources may include an indication of the transmission beam (or the potential transmission beams) the UE 415 intends to use for performing the sidelink communication. In some examples, the indication may include a spatial configuration of the transmission beam, or an index associated with the transmission beam, or a combination thereof. In some examples, the UE 415 may transmit the request for resources as part of sidelink information data (e.g., a SidelinkUEInformation message) sent to the base station 405. In some examples, the request for resources may include a request for a dynamic resource, or a request for semi-persistent resources, or a combination thereof.

In some examples, at 435, the base station 405 may determine a transmission configuration for the UE 415 based on the request for resources. For example, the base station 405 may configure the UE 415 to transmit a reference signal (e.g., an SRS or another uplink reference signal) using the transmission beam indicated in the request for resources. In some examples, the transmission configuration may be periodic, aperiodic, or semi-persistent. In some examples, the base station 405 may configure the UE 415 to transmit the reference signal using multiple slots or symbols. The base station 405 may wish to schedule the sidelink communication from the UE 415 to be multiplexed with uplink transmissions from another device (not shown), and so the base station 405 may wish to determine timing information for multiple reception beams to determine which uplink transmissions of which device to multiplex with the sidelink communication from the UE 415. Determining timing information for multiple reception beams may involve too much signaling overhead at the base station 405 and the UE 415 due to configuring reference signals for each possible reception beam at the base station 405, and so the base station 405 may determine instead to configure reference signals for a subset of the possible reception beams and then intelligently schedule the sidelink communication to be multiplexed with uplink transmissions from another device based on the configured reference signals. In some examples, at 440, the base station 405 may transmit the transmission configuration to the UE 415.

In some examples, at 445, the UE 415 may transmit the reference signal (or reference signals) using the transmission beam based on the transmission configuration from the base station 405. In some examples, the UE 415 may transmit the reference signal based on a downlink transmission timing (e.g., based on a TA value of zero). In some examples, at 450, the base station 405 may monitor for the reference signal using one or more reception beams based on the transmission configuration. For example, the base station 405 may monitor for a first reference signal transmitted in a first symbol or slot using a first reception beam, and the base station 405 may monitor for a second reference signal (which may be a repetition of the first reference signal) transmitted in a second symbol or slot using a second reception beam.

At 455, the base station 405 may determine timing information associated with the transmission beam and at least one reception beam. In some examples, determining the timing information may include measuring a time delay associated with monitoring for the reference signal on a reception beam, and determining a TA value associated with the reception beam and the transmission beam based on the time delay. In some examples, the base station 405 may determine a TA value associated with each reception beam use for monitoring for the reference signal. In some examples, the base station 405 may use a TA value associated with a first reception beam that was monitor for a second reception beam that was not monitored, but which may have a similar spatial configuration to the first reception beam (e.g., if the first reception beam is close by the second reception beam). In some examples, the base station 405 may determine the timing information based on a spatial configuration (e.g., a direction) of one or more of the reception beams at the base station 405.

In some examples, the base station 405 may determine the base station 405 is unable to measure the reference signal using a reception beam based on monitoring for the reference signal. The base station 405 may determine the combination of the reception beam and the transmission beam results in low interference at the base station 405. The base station 405 may determine that no adjustment is needed for the TA value associated with the transmission beam. For example, the base station 405 may determine the UE 415 may use a TA value of zero when performing the sidelink communication.

At 460, the base station 405 may transmit a resource grant to the UE 415. The resource grant may include an indication of the timing information. In some examples, the resource grant may include the resources (e.g., the time and frequency resources) granted to the UE 415 for performing the sidelink communication. In some examples, the base station may transmit the resource grant in DCI signaling, or in a MAC-CE.

In some examples, the base station 405 may inform the UE 415 of the TA value (or TA values) corresponding to the transmission beam. In some examples, the base station 405 may determine not to include explicit signaling of the TA value when no adjustment is needed, in order to reduce signaling overhead. If the UE 415 determines the resource grant lacks explicit signaling of the TA value, the UE 415 may assume the TA value used for transmitting the reference signals (e.g., a TA value of zero) is to be used for performing the sidelink communication. In some examples, the resource grant may include a TA index corresponding to a TA configuration, where the TA configuration may include the TA value to be used by the UE 415 in the sidelink communication.

At 465, the UE 415 may perform the sidelink communication using the transmission beam according to the timing information indicated in the resource grant. In some examples, the UE 415 may use a TA value indicated in the resource grant when performing the sidelink communication. In some examples, the sidelink communication may be multiplexed (e.g., from the perspective of the base station 405) with an uplink transmission from another device (not shown), for example using an FDM scheme as configured by the base station 405.

In some examples, the TA values indicated by the base station 405 may be accumulative. For example, a UE 415 may receive a first TA value in response to a first request for resources for a first sidelink communication as described herein. Subsequently, the UE 415 may transmit a second request for resources for a second sidelink communication, and receive a second TA value in a resource grant for the second sidelink communication. The UE 415 may then perform the second sidelink communication using a TA value corresponding to a sum of the first TA value and the second TA value, rather than using the second TA value.

The operations performed by the base station 405 and the UE 415 may therefore support improvement to the UE 415 sidelink transmission timing and, in some examples, may promote improvements to the UE 415 reliability, among other benefits.

Figure 5:
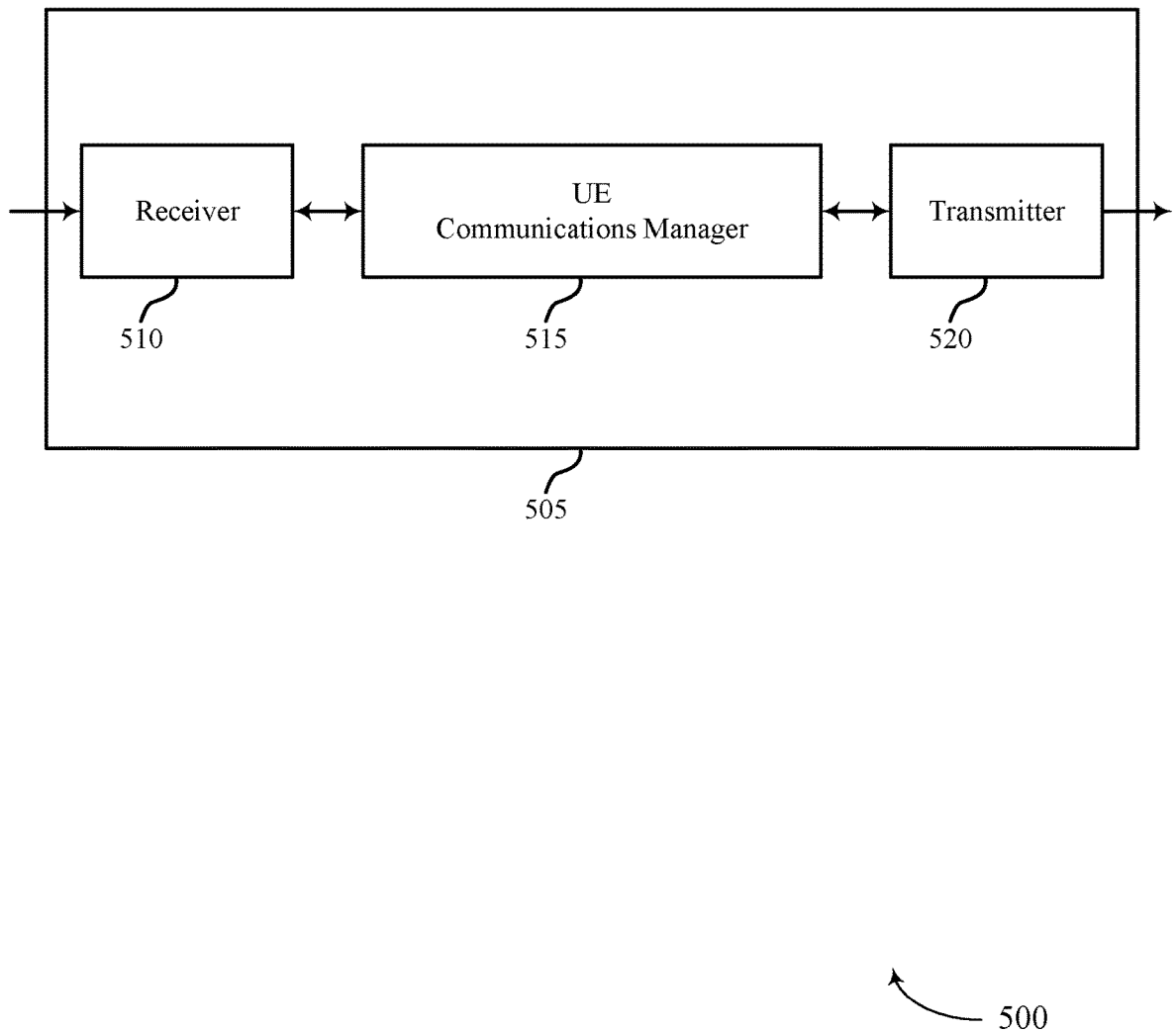
FIGS. 5 and 6 show block diagrams of devices that support techniques for communicating sidelink transmission timing in accordance with various aspects of the present disclosure.

FIG. 5 shows a block diagram 500 of a device 505 that supports techniques for communicating sidelink transmission timing in accordance with various aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for communicating sidelink transmission timing). Information may be passed on to other components of the device 505. The receiver 510 may be an example of aspects of the transceiver 820 described with reference to FIG. 8. The receiver 510 may utilize a single antenna or a set of antennas.

The UE communications manager 515 may identify a transmission beam for a sidelink communication, transmit a request for resources corresponding to the transmission beam, the request including an indication of the transmission beam, receive a resource grant indicating timing information associated with the transmission beam, and perform the sidelink communication using the transmission beam based on the timing information.

The UE communications manager 515 as described herein may be implemented to realize one or more potential advantages. One implementation may allow the device 505 to save power and increase battery life by communicating with a base station 105 (as shown in FIG. 1) more efficiently. For example, the device 505 may efficiently obtain sidelink transmission timing information transmitted by a base station 105, as the device 505 may be able to reconfigure a timing of sidelink transmissions according to scheduled uplink transmissions. Another implementation may promote low latency communications at the device 505, as a number of resources allocated to sidelink transmissions may be reduced. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
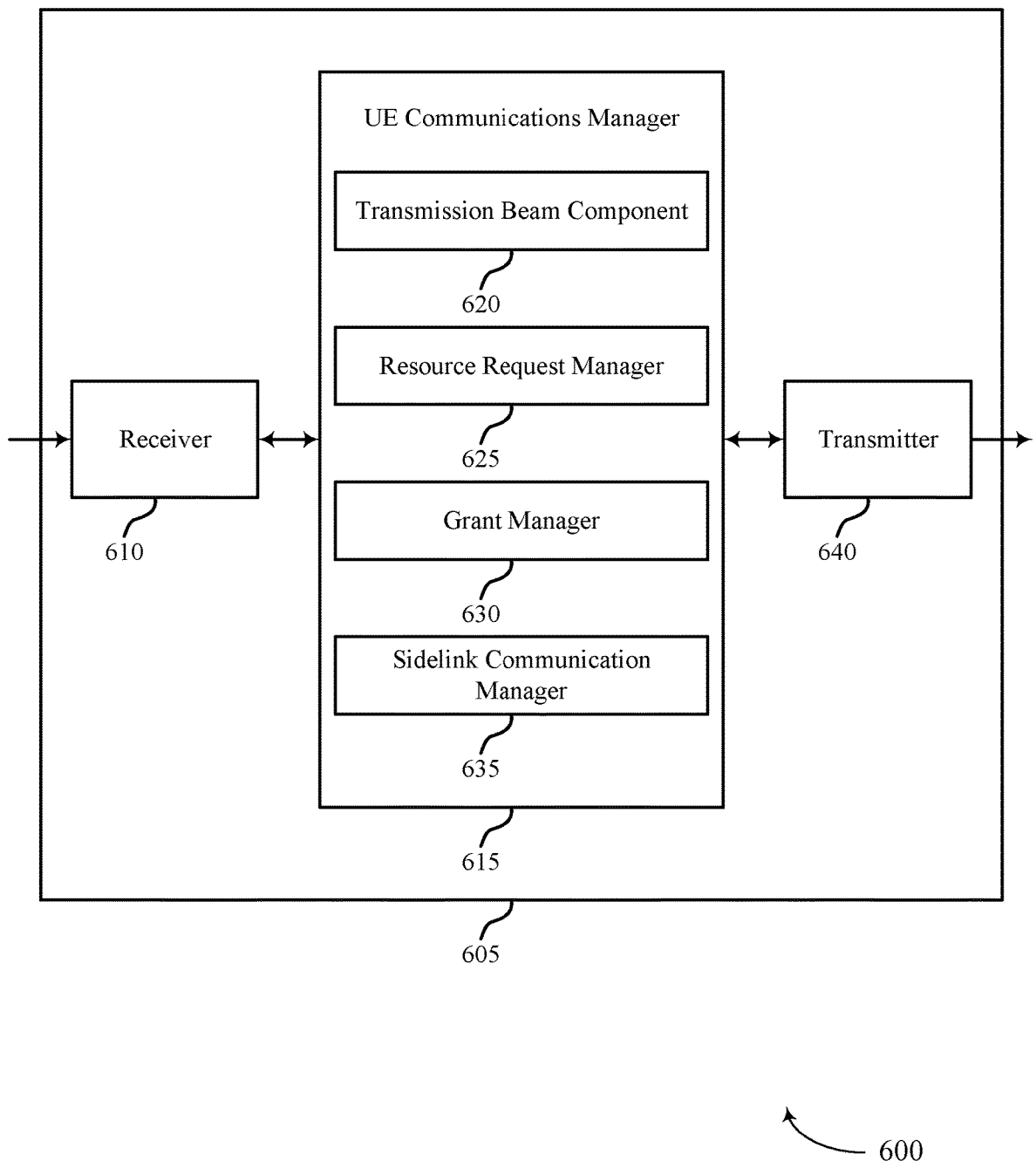

FIG. 6 shows a block diagram 600 of a device 605 that supports techniques for communicating sidelink transmission timing in accordance with various aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for communicating sidelink transmission timing). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a transmission beam component 620, a resource request manager 625, a grant manager 630, and a sidelink communication manager 635. The UE communications manager 615 may be an example of aspects of the UE communications manager 810 described herein.

The transmission beam component 620 may identify a transmission beam for a sidelink communication. The resource request manager 625 may transmit a request for resources corresponding to the transmission beam, the request including an indication of the transmission beam. The grant manager 630 may receive a resource grant indicating timing information associated with the transmission beam. The sidelink communication manager 635 may perform the sidelink communication using the transmission beam based on the timing information.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
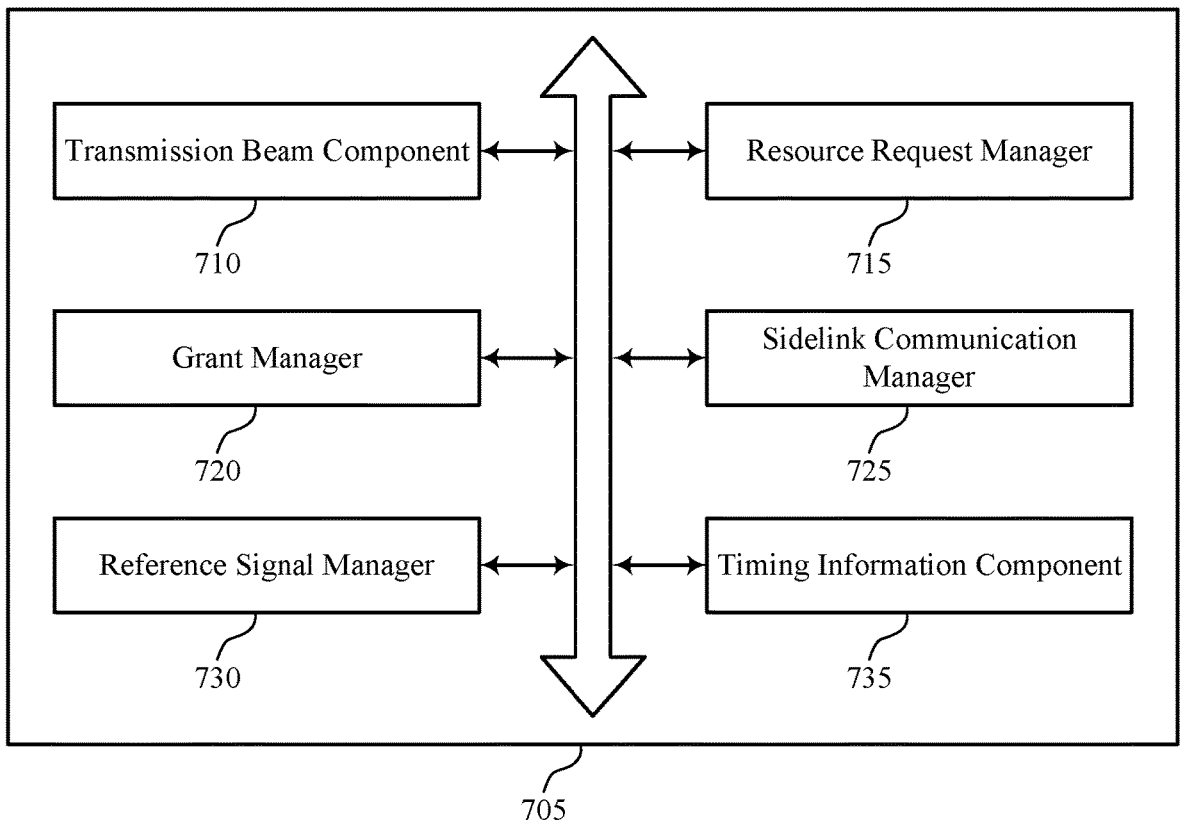
FIG. 7 shows a block diagram of a user equipment (UE) communications manager that supports techniques for communicating sidelink transmission timing in accordance with various aspects of the present disclosure.

FIG. 7 shows a block diagram 700 of a UE communications manager 705 that supports techniques for communicating sidelink transmission timing in accordance with various aspects of the present disclosure. The UE communications manager 705 may be an example of aspects of a UE communications manager 515, a UE communications manager 615, or a UE communications manager 810 described herein. The UE communications manager 705 may include a transmission beam component 710, a resource request manager 715, a grant manager 720, a sidelink communication manager 725, a reference signal manager 730, and a timing information component 735. Each of these modules may communicate, directly or indirectly, with one another (e.g., via one or more buses).

The transmission beam component 710 may identify a transmission beam for a sidelink communication. The resource request manager 715 may transmit a request for resources corresponding to the transmission beam, the request including an indication of the transmission beam. In some examples, the resource request manager 715 may transmit sidelink information data, where the sidelink information data includes the request for resources. In some cases, the indication of the transmission beam may include an index. In some cases, the request for resources may include a request for a dynamic resource, a request for semi-persistent resources, or a combination thereof.

The grant manager 720 may receive a resource grant indicating timing information associated with the transmission beam. In some examples, the grant manager 720 may receive the resource grant in DCI signaling or a MAC-CE. In some examples, the grant manager 720 may receive a second resource grant indicating a second TA value. In some cases, the resource grant may be based on the reference signal.

In some cases, the resource grant may lack explicit signaling of the TA value. In some examples, the grant manager 720 may determine the TA value is zero based on the lack of explicit signaling in the resource grant. In some cases, the resource grant indicates resources for performing the sidelink communication.

The sidelink communication manager 725 may perform the sidelink communication using the transmission beam based on the timing information. In some examples, the sidelink communication manager 725 may perform the sidelink communication based on a sum of the TA value and the second TA value. In some cases, the sidelink communication may include a communication from the UE to a receiving device.

The reference signal manager 730 may receive a transmission configuration for a reference signal corresponding to the identified transmission beam. In some examples, the reference signal manager 730 may transmit the reference signal using the transmission beam based on the transmission configuration. In some examples, the reference signal manager 730 may transmit the reference signal during one or more symbols or slots based on the transmission configuration. In some examples, the reference signal manager 730 may transmit the reference signal based on a timing associated with downlink transmissions. In some cases, the reference signal may include an SRS. In some cases, the transmission configuration may include a periodic reference signal configuration, an aperiodic reference signal configuration, a semi-persistent reference signal configuration, or a combination thereof.

The timing information component 735 may receive an indication of one or more TA values, where each TA value is associated with a reception beam of one or more reception beams. In some cases, the timing information may include a TA value. In some cases, the TA value may correspond to a reception beam. In some cases, the resource grant may include an indication of an index associated with the TA value. In some cases, the TA value may be zero.

Figure 8:
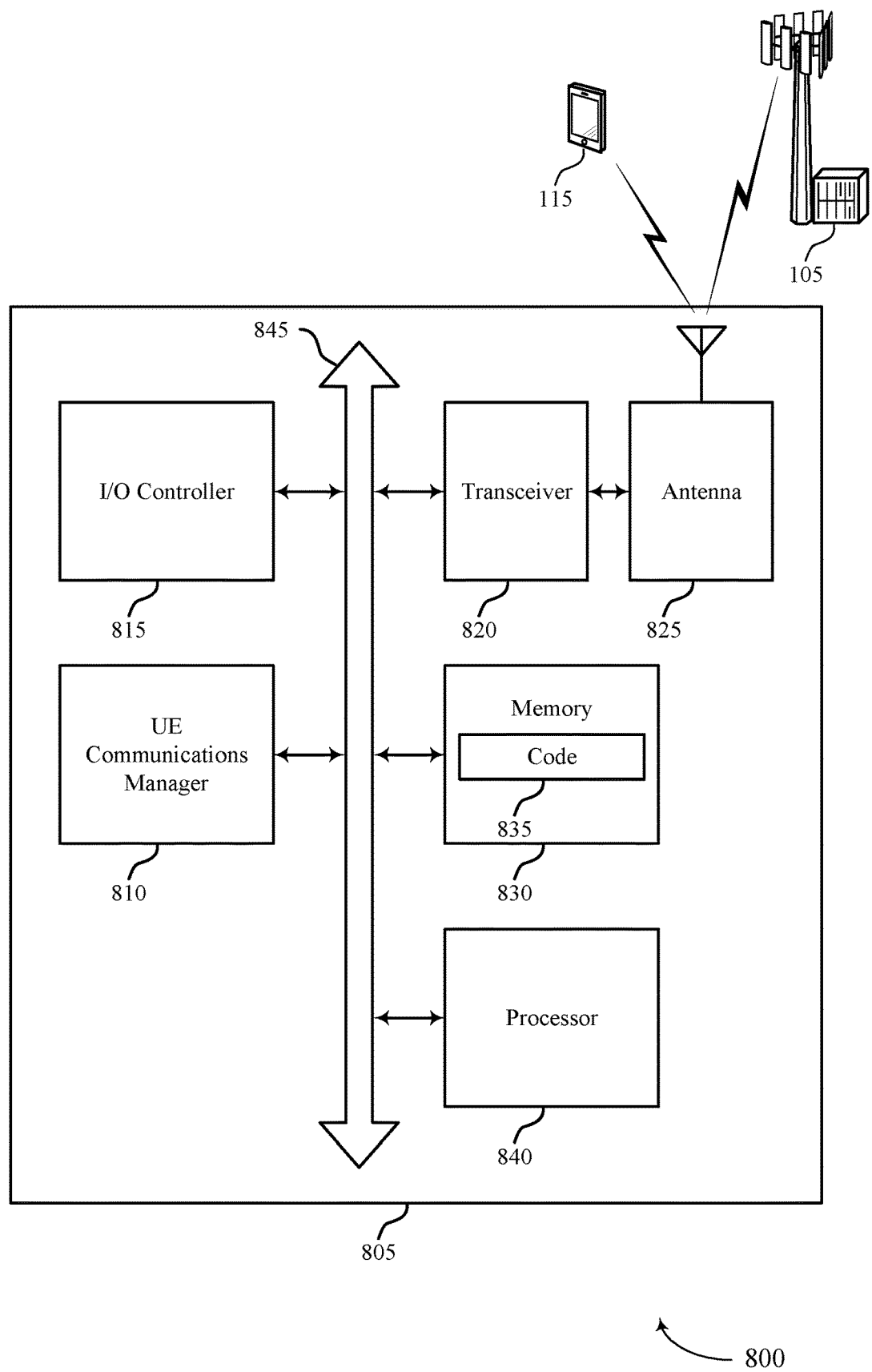
FIG. 8 shows a diagram of a system including a device that supports techniques for communicating sidelink transmission timing in accordance with various aspects of the present disclosure.

FIG. 8 shows a diagram of a system 800 including a device 805 that supports techniques for communicating sidelink transmission timing in accordance with various aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may identify a transmission beam for a sidelink communication, transmit a request for resources corresponding to the transmission beam, the request including an indication of the transmission beam, receive a resource grant indicating timing information associated with the transmission beam, and perform the sidelink communication using the transmission beam based on the timing information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for communicating sidelink transmission timing).

The processor 840 of the device 805 (e.g., controlling the receiver 510, the transmitter 520, or the transceiver 820) may reduce power consumption and increase sidelink transmission reliability based on identifying timing information indicated in the resource grant. In some examples, the processor 840 of the device 805 may reconfigure sidelink transmission timing based on the timing information received from the base station. For example, the processor 840 of the device 805 may turn on one or more processing units for configuring the sidelink transmission timing, increase a processing clock, or a similar mechanism within the device 805. As such, when subsequent resource grants are received, the processor 840 may be ready to respond more efficiently through the reduction of a ramp up in processing power. The improvements in power saving and sidelink transmission reliability may further increase battery life at the device 805 (for example, by eliminating unnecessary repeated sidelink transmissions, etc.).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
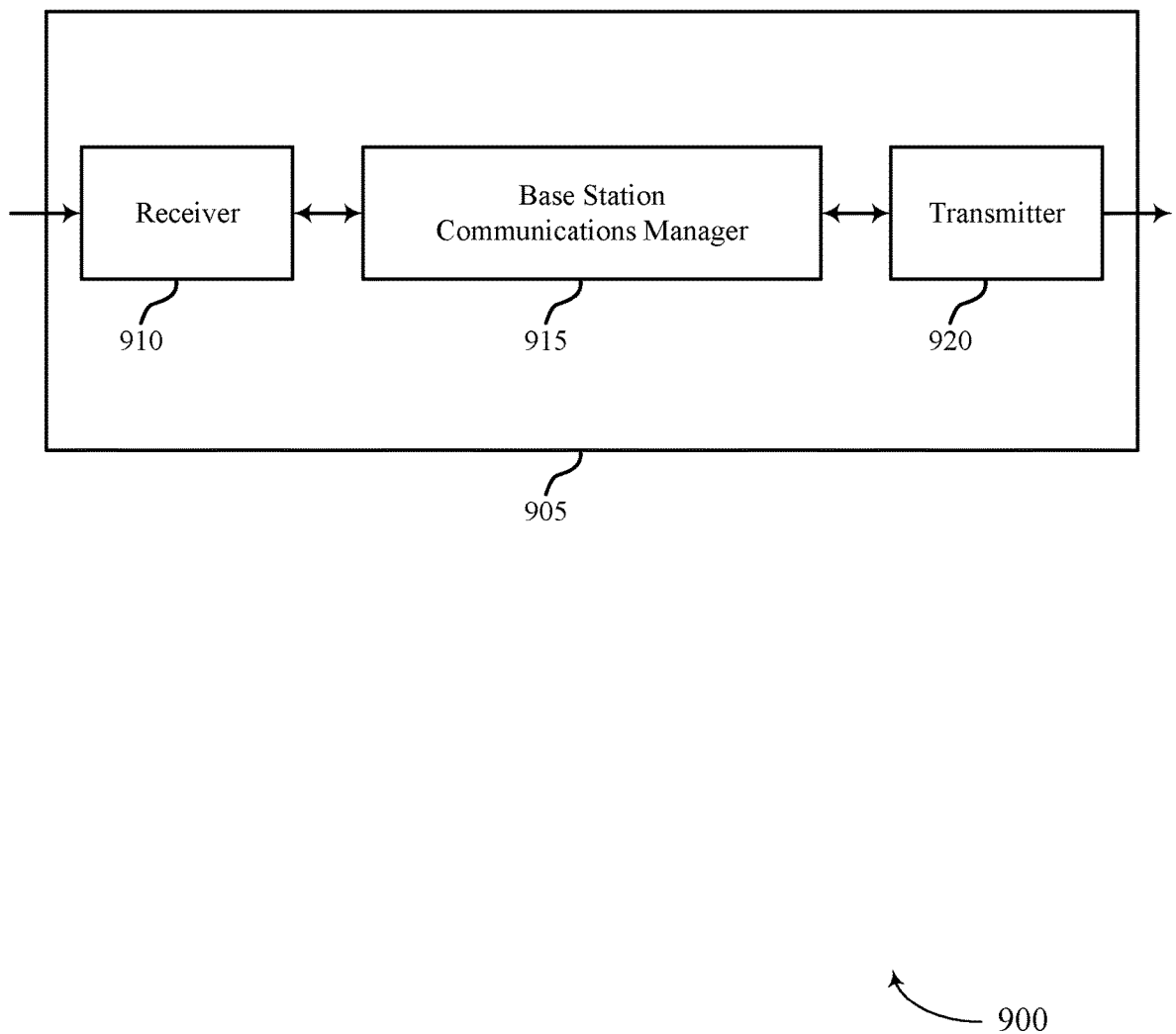
FIGS. 9 and 10 show block diagrams of devices that support techniques for communicating sidelink transmission timing in accordance with various aspects of the present disclosure.

FIG. 9 shows a block diagram 900 of a device 905 that supports techniques for communicating sidelink transmission timing in accordance with various aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for communicating sidelink transmission timing). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive, at a base station, a request from a UE for resources corresponding to a transmission beam for a sidelink communication, the request including an indication of the transmission beam, determine timing information associated with the transmission beam and a reception beam at the base station, and transmit a resource grant to the UE indicating the timing information.

The base station communications manager 915 as described herein may be implemented to realize one or more potential advantages. One implementation may allow the device 905 to save power by communicating with a UE 115 (as shown in FIG. 1) more efficiently. For example, the device 905 may efficiently transmit sidelink transmission timing information to a UE 115, as the device 905 may be able to determine timing information based on beams at the device 905 and the UE 115. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
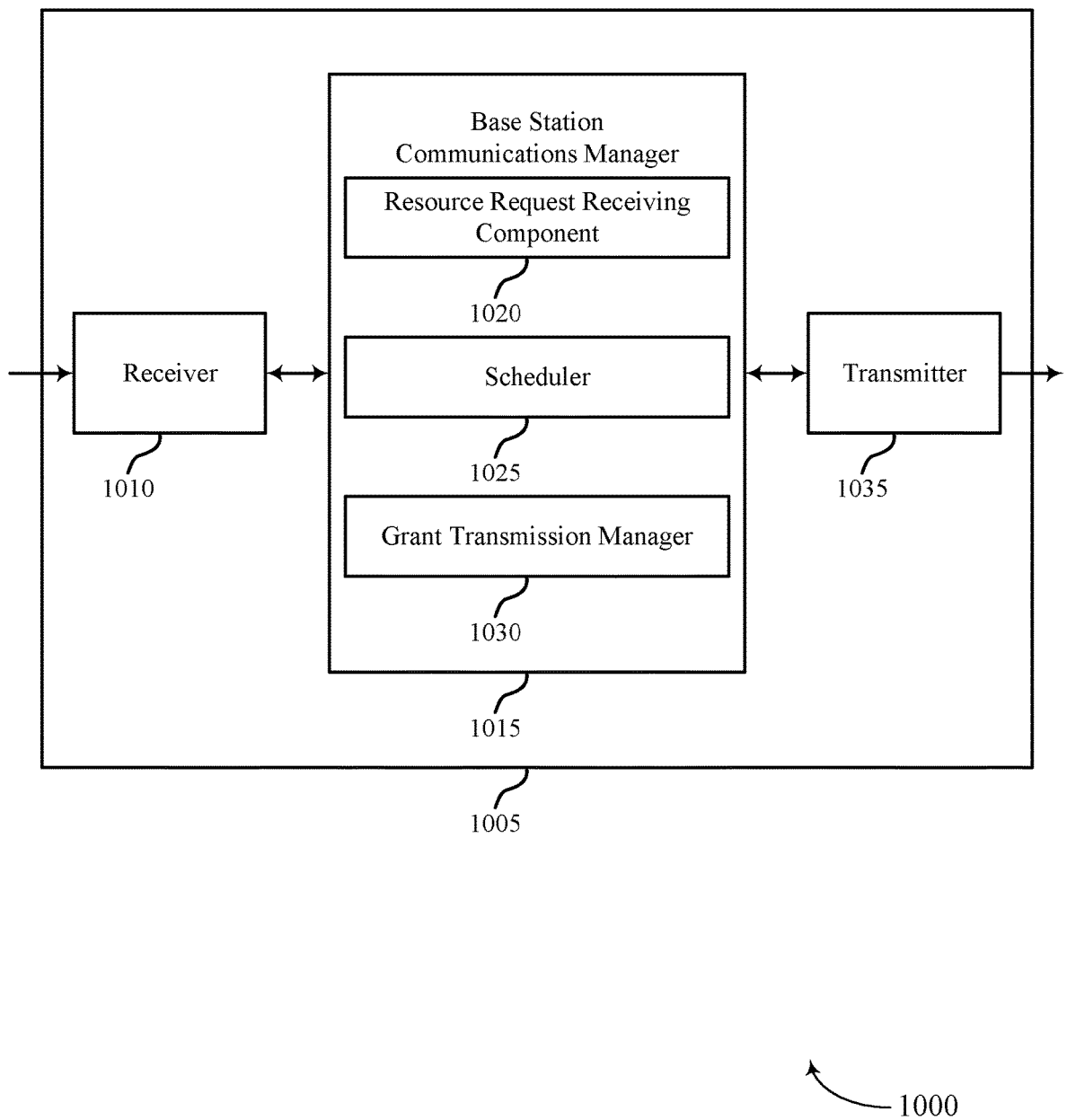

FIG. 10 shows a block diagram 1000 of a device 1005 that supports techniques for communicating sidelink transmission timing in accordance with various aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for communicating sidelink transmission timing). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a resource request receiving component 1020, a scheduler 1025, and a grant transmission manager 1030. The base station communications manager 1015 may be an example of aspects of the base station communications manager 1210 described herein.

The resource request receiving component 1020 may receive, at a base station, a request from a UE for resources corresponding to a transmission beam for a sidelink communication, the request including an indication of the transmission beam.

The scheduler 1025 may determine timing information associated with the transmission beam and a reception beam at the base station.

The grant transmission manager 1030 may transmit a resource grant to the UE indicating the timing information.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
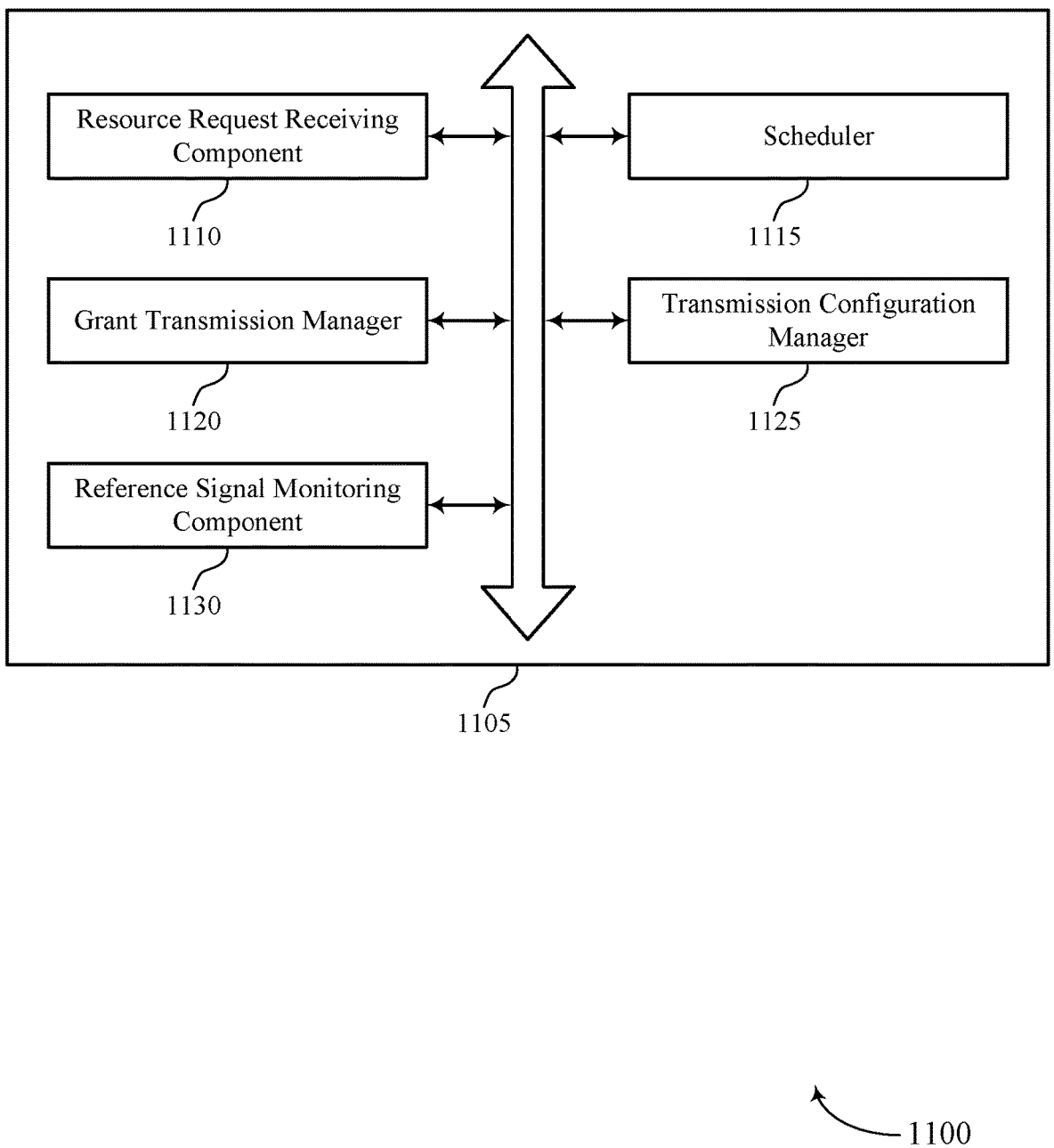
FIG. 11 shows a block diagram of a base station communications manager that supports techniques for communicating sidelink transmission timing in accordance with various aspects of the present disclosure.

FIG. 11 shows a block diagram 1100 of a base station communications manager 1105 that supports techniques for communicating sidelink transmission timing in accordance with various aspects of the present disclosure. The base station communications manager 1105 may be an example of aspects of a base station communications manager 915, a base station communications manager 1015, or a base station communications manager 1210 described herein. The base station communications manager 1105 may include a resource request receiving component 1110, a scheduler 1115, a grant transmission manager 1120, a transmission configuration manager 1125, and a reference signal monitoring component 1130. Each of these modules may communicate, directly or indirectly, with one another (e.g., via one or more buses).

The resource request receiving component 1110 may receive a request from a UE for resources corresponding to a transmission beam for a sidelink communication, the request including an indication of the transmission beam. In some examples, the resource request receiving component 1110 may receive sidelink information data, where the sidelink information data includes the request for resources. In some cases, the indication of the transmission beam may include an index. In some cases, the request for resources may include a request for a dynamic resource, a request for semi-persistent resources, or a combination thereof.

The scheduler 1115 may determine timing information associated with the transmission beam and a reception beam at the base station. In some examples, the scheduler 1115 may schedule the sidelink communication based on uplink transmissions from a second UE received using the reception beam. In some examples, the scheduler 1115 may measure a time delay associated with the reference signal and the reception beam. In some examples, the scheduler 1115 may determine a TA value based on the time delay, where the timing information includes the TA value. In some examples, the scheduler 1115 may determine one or more TA values, where each TA value is associated with a reception beam of one or more reception beams. In some examples, the scheduler 1115 may determine the TA value is zero. In some examples, the scheduler 1115 may determine the TA value is zero based on the absence of the reference signal. In some examples, the scheduler 1115 may determine the timing information based on a spatial configuration of the reception beam.

The grant transmission manager 1120 may transmit a resource grant to the UE indicating the timing information. In some examples, the grant transmission manager 1120 may transmit the resource grant in DCI signaling or a MAC-CE. In some examples, the grant transmission manager 1120 may transmit an indication of the TA values in the resource grant. In some cases, the resource grant may include an indication of an index associated with the TA value. In some cases, the resource grant may lack explicit signaling of the TA value. In some cases, the resource grant may include an indication of an index associated with the timing information. In some cases, the resource grant may indicate resources for performing the sidelink communication.

The transmission configuration manager 1125 may determine a transmission configuration for the reception beam and a reference signal corresponding to the transmission beam. In some examples, the transmission configuration manager 1125 may transmit the transmission configuration to the UE. In some examples, the transmission configuration manager 1125 may configure the UE to transmit the reference signal during one or more symbols or slots. In some cases, the reference signal may include an SRS. In some cases, the transmission configuration may include a periodic reference signal configuration, an aperiodic reference signal configuration, a semi-persistent reference signal configuration, or a combination thereof.

The reference signal monitoring component 1130 may monitor for the reference signal using the reception beam based on the transmission configuration, where determining the timing information is based on the monitoring. In some examples, the reference signal monitoring component 1130 may monitor for the reference signal using the reception beam during a first symbol or slot. In some examples, the reference signal monitoring component 1130 may monitor for the reference signal using a second reception beam during a second symbol or slot. In some examples, the reference signal monitoring component 1130 may determine an absence of the reference signal based on the monitoring.

Figure 12:
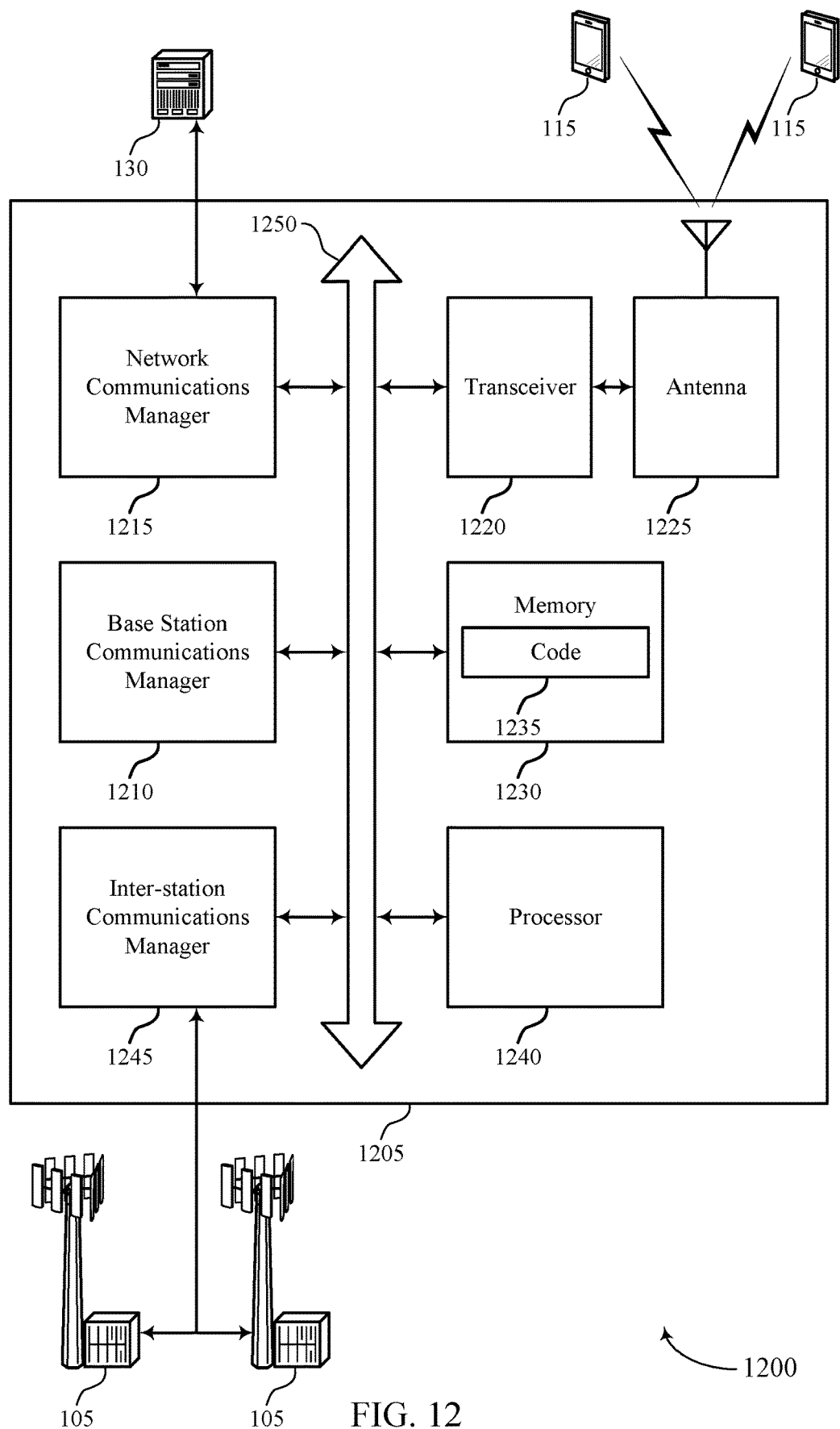
FIG. 12 shows a diagram of a system including a device that supports techniques for communicating sidelink transmission timing in accordance with various aspects of the present disclosure.

FIG. 12 shows a diagram of a system 1200 including a device 1205 that supports techniques for communicating sidelink transmission timing in accordance with various aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may receive, at a base station, a request from a UE for resources corresponding to a transmission beam for a sidelink communication, the request including an indication of the transmission beam, determine timing information associated with the transmission beam and a reception beam at the base station, and transmit a resource grant to the UE indicating the timing information.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for communicating sidelink transmission timing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
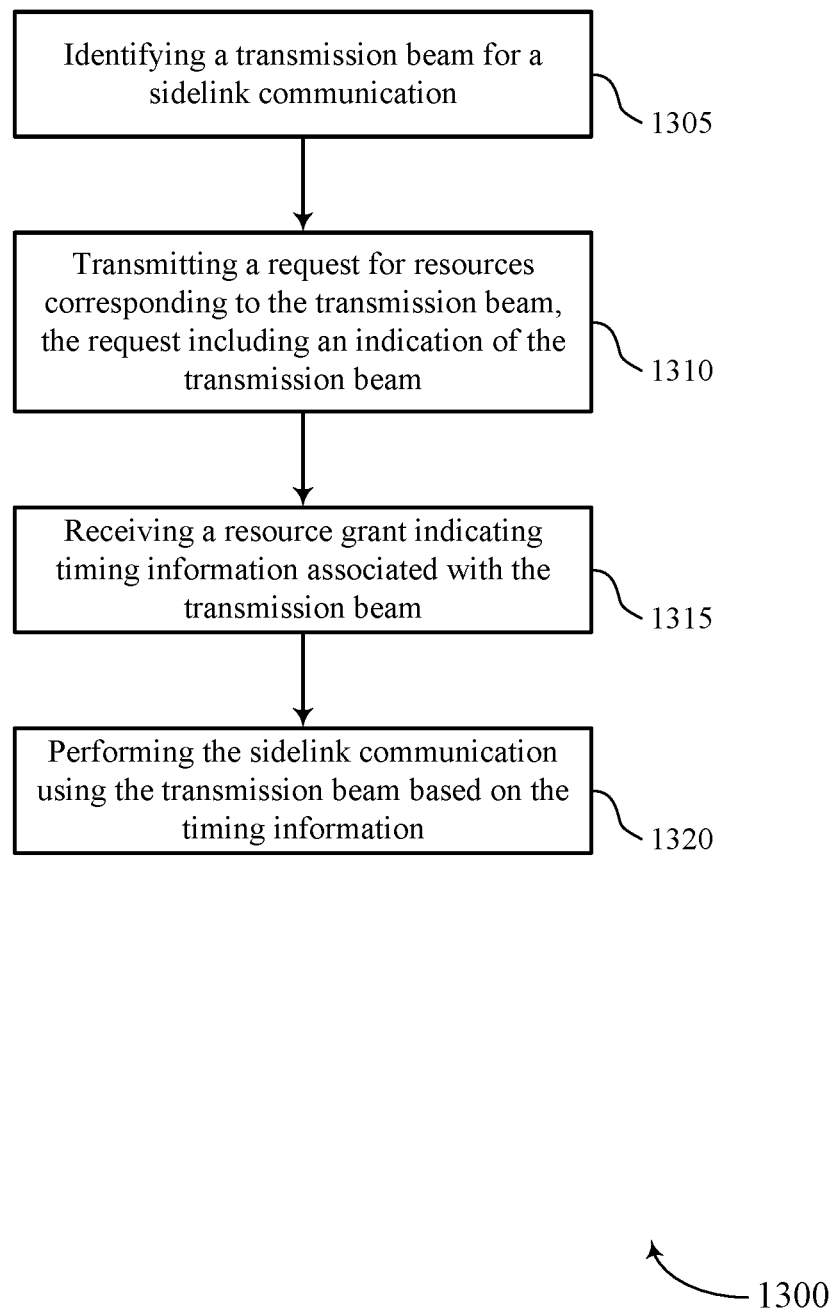
FIGS. 13 through 21 show flowcharts illustrating methods that support techniques for communicating sidelink transmission timing in accordance with various aspects of the present disclosure.

FIG. 13 shows a flowchart illustrating a method 1300 that supports techniques for communicating sidelink transmission timing in accordance with various aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a transmission beam for a sidelink communication. The operations of 1305 may be performed according to the methods described herein. In some examples, aspects of the operations of 1305 may be performed by a transmission beam component as described with reference to FIGS. 5 through 8.

At 1310, the UE may transmit a request for resources corresponding to the transmission beam, the request including an indication of the transmission beam. The operations of 1310 may be performed according to the methods described herein. In some examples, aspects of the operations of 1310 may be performed by a resource request manager as described with reference to FIGS. 5 through 8.

At 1315, the UE may receive a resource grant indicating timing information associated with the transmission beam. The operations of 1315 may be performed according to the methods described herein. In some examples, aspects of the operations of 1315 may be performed by a grant manager as described with reference to FIGS. 5 through 8.

At 1320, the UE may perform the sidelink communication using the transmission beam based on the timing information. The operations of 1320 may be performed according to the methods described herein. In some examples, aspects of the operations of 1320 may be performed by a sidelink communication manager as described with reference to FIGS. 5 through 8.

Figure 14:
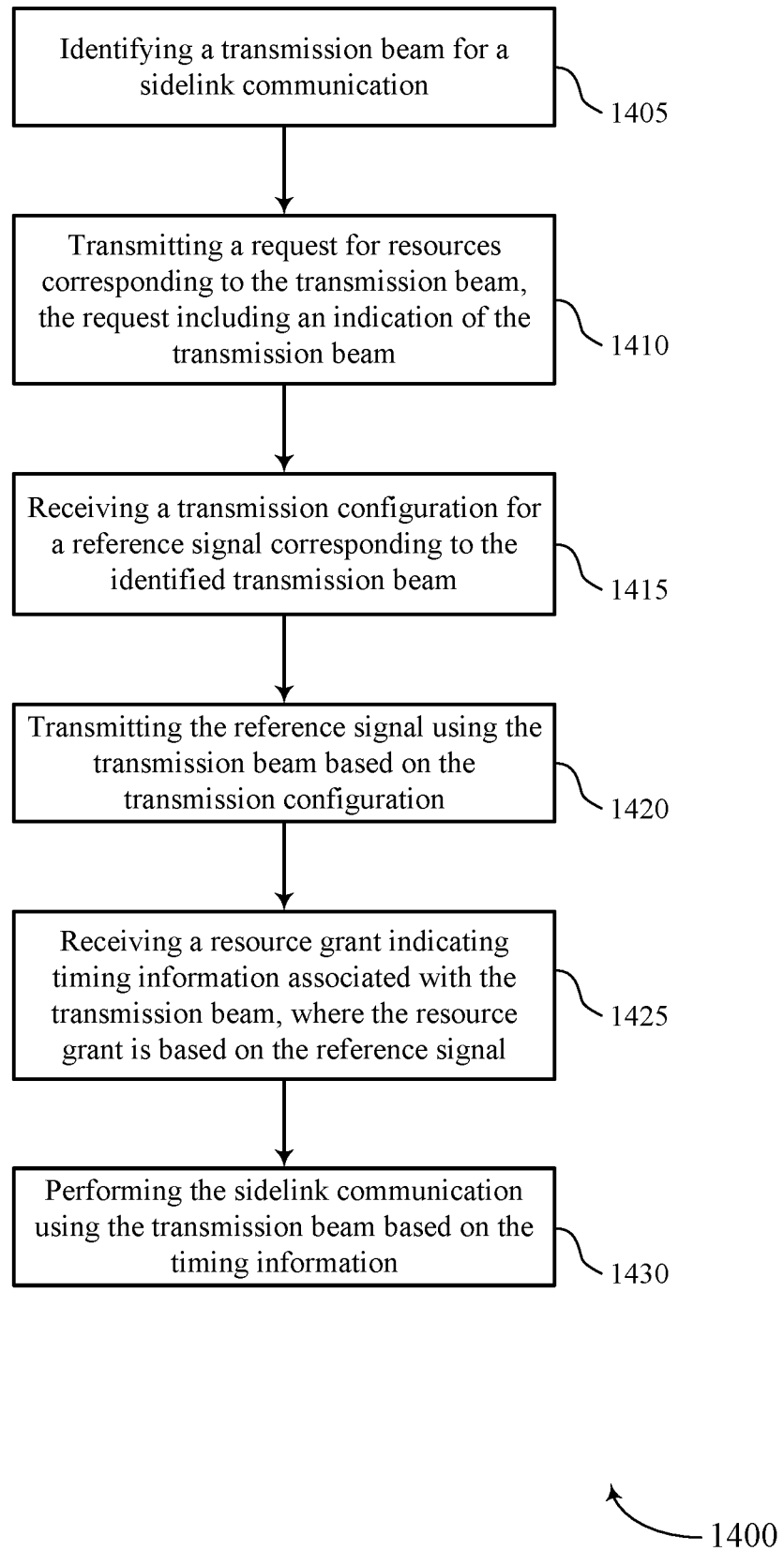

FIG. 14 shows a flowchart illustrating a method 1400 that supports techniques for communicating sidelink transmission timing in accordance with various aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a transmission beam for a sidelink communication. The operations of 1405 may be performed according to the methods described herein. In some examples, aspects of the operations of 1405 may be performed by a transmission beam component as described with reference to FIGS. 5 through 8.

At 1410, the UE may transmit a request for resources corresponding to the transmission beam, the request including an indication of the transmission beam. The operations of 1410 may be performed according to the methods described herein. In some examples, aspects of the operations of 1410 may be performed by a resource request manager as described with reference to FIGS. 5 through 8.

At 1415, the UE may receive a transmission configuration for a reference signal corresponding to the identified transmission beam. The operations of 1415 may be performed according to the methods described herein. In some examples, aspects of the operations of 1415 may be performed by a reference signal manager as described with reference to FIGS. 5 through 8.

At 1420, the UE may transmit the reference signal using the transmission beam based on the transmission configuration. The operations of 1420 may be performed according to the methods described herein. In some examples, aspects of the operations of 1420 may be performed by a reference signal manager as described with reference to FIGS. 5 through 8.

At 1425, the UE may receive a resource grant indicating timing information associated with the transmission beam, where the resource grant is based on the reference signal. The operations of 1425 may be performed according to the methods described herein. In some examples, aspects of the operations of 1425 may be performed by a grant manager as described with reference to FIGS. 5 through 8.

At 1430, the UE may perform the sidelink communication using the transmission beam based on the timing information. The operations of 1430 may be performed according to the methods described herein. In some examples, aspects of the operations of 1430 may be performed by a sidelink communication manager as described with reference to FIGS. 5 through 8.

Figure 15:
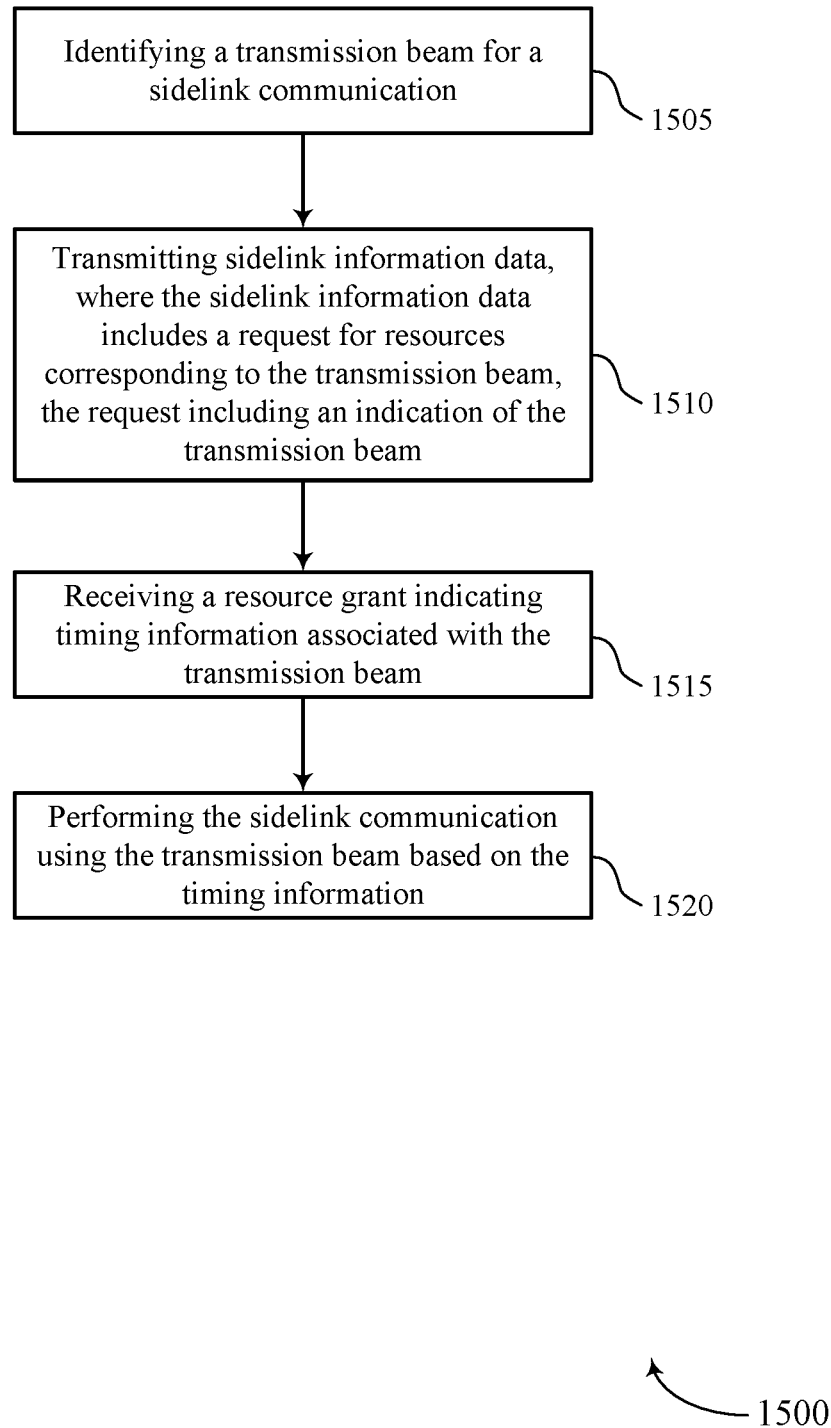

FIG. 15 shows a flowchart illustrating a method 1500 that supports techniques for communicating sidelink transmission timing in accordance with various aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a transmission beam for a sidelink communication. The operations of 1505 may be performed according to the methods described herein. In some examples, aspects of the operations of 1505 may be performed by a transmission beam component as described with reference to FIGS. 5 through 8.

At 1510, the UE may transmit sidelink information data, where the sidelink information data includes a request for resources corresponding to the transmission beam, the request including an indication of the transmission beam. The operations of 1510 may be performed according to the methods described herein. In some examples, aspects of the operations of 1510 may be performed by a resource request manager as described with reference to FIGS. 5 through 8.

At 1515, the UE may receive a resource grant indicating timing information associated with the transmission beam. The operations of 1515 may be performed according to the methods described herein. In some examples, aspects of the operations of 1515 may be performed by a grant manager as described with reference to FIGS. 5 through 8.

At 1520, the UE may perform the sidelink communication using the transmission beam based on the timing information. The operations of 1520 may be performed according to the methods described herein. In some examples, aspects of the operations of 1520 may be performed by a sidelink communication manager as described with reference to FIGS. 5 through 8.

Figure 16:
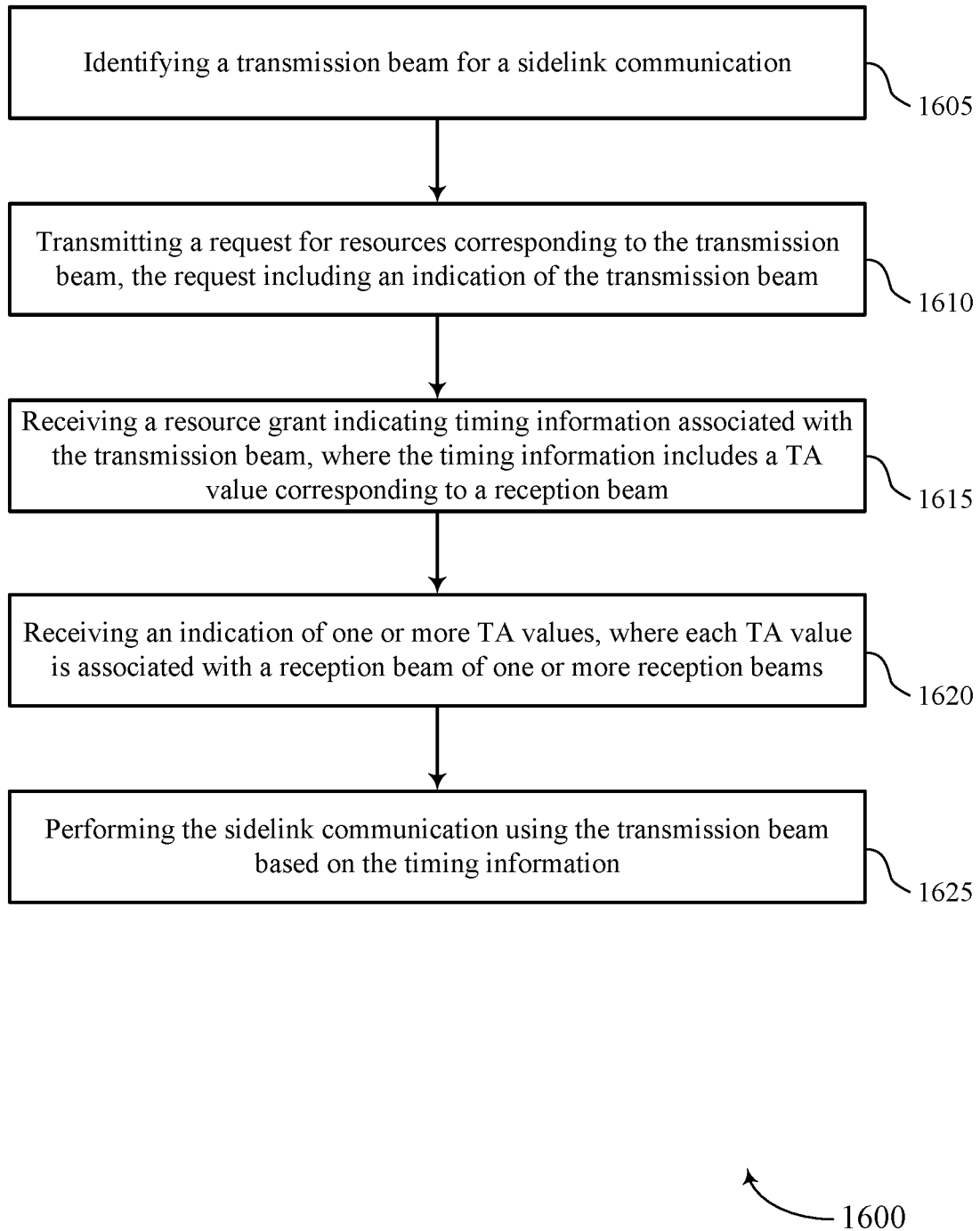

FIG. 16 shows a flowchart illustrating a method 1600 that supports techniques for communicating sidelink transmission timing in accordance with various aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a transmission beam for a sidelink communication. The operations of 1605 may be performed according to the methods described herein. In some examples, aspects of the operations of 1605 may be performed by a transmission beam component as described with reference to FIGS. 5 through 8.

At 1610, the UE may transmit a request for resources corresponding to the transmission beam, the request including an indication of the transmission beam. The operations of 1610 may be performed according to the methods described herein. In some examples, aspects of the operations of 1610 may be performed by a resource request manager as described with reference to FIGS. 5 through 8.

At 1615, the UE may receive a resource grant indicating timing information associated with the transmission beam, where the timing information includes a TA value corresponding to a reception beam. The operations of 1615 may be performed according to the methods described herein. In some examples, aspects of the operations of 1615 may be performed by a grant manager as described with reference to FIGS. 5 through 8.

At 1620, the UE may receive an indication of one or more TA values, where each TA value is associated with a reception beam of one or more reception beams. The operations of 1620 may be performed according to the methods described herein. In some examples, aspects of the operations of 1620 may be performed by a timing information component as described with reference to FIGS. 5 through 8.

At 1625, the UE may perform the sidelink communication using the transmission beam based on the timing information. The operations of 1625 may be performed according to the methods described herein. In some examples, aspects of the operations of 1625 may be performed by a sidelink communication manager as described with reference to FIGS. 5 through 8.

Figure 17:
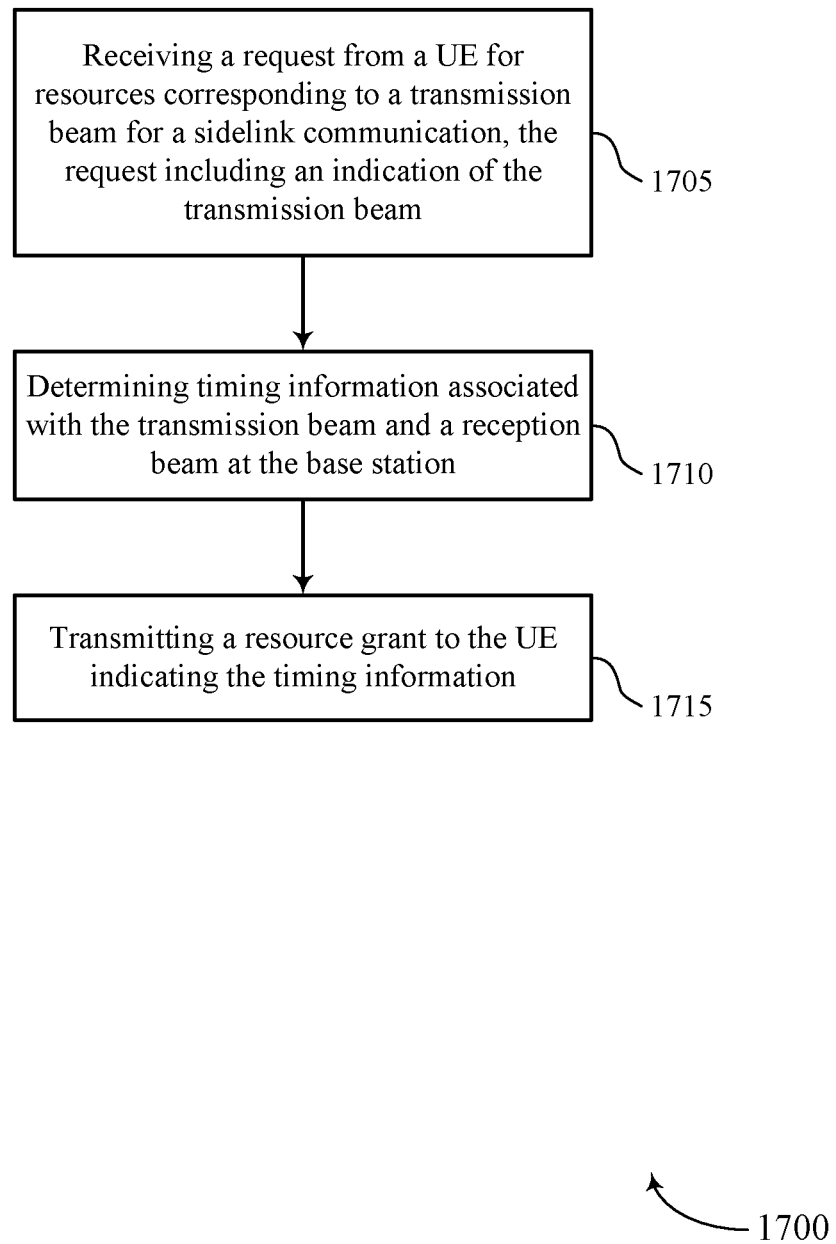

FIG. 17 shows a flowchart illustrating a method 1700 that supports techniques for communicating sidelink transmission timing in accordance with various aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a request from a UE for resources corresponding to a transmission beam for a sidelink communication, the request including an indication of the transmission beam. The operations of 1705 may be performed according to the methods described herein. In some examples, aspects of the operations of 1705 may be performed by a resource request receiving component as described with reference to FIGS. 9 through 12.

At 1710, the base station may determine timing information associated with the transmission beam and a reception beam at the base station. The operations of 1710 may be performed according to the methods described herein. In some examples, aspects of the operations of 1710 may be performed by a scheduler as described with reference to FIGS. 9 through 12.

At 1715, the base station may transmit a resource grant to the UE indicating the timing information. The operations of 1715 may be performed according to the methods described herein. In some examples, aspects of the operations of 1715 may be performed by a grant transmission manager as described with reference to FIGS. 9 through 12.

Figure 18:
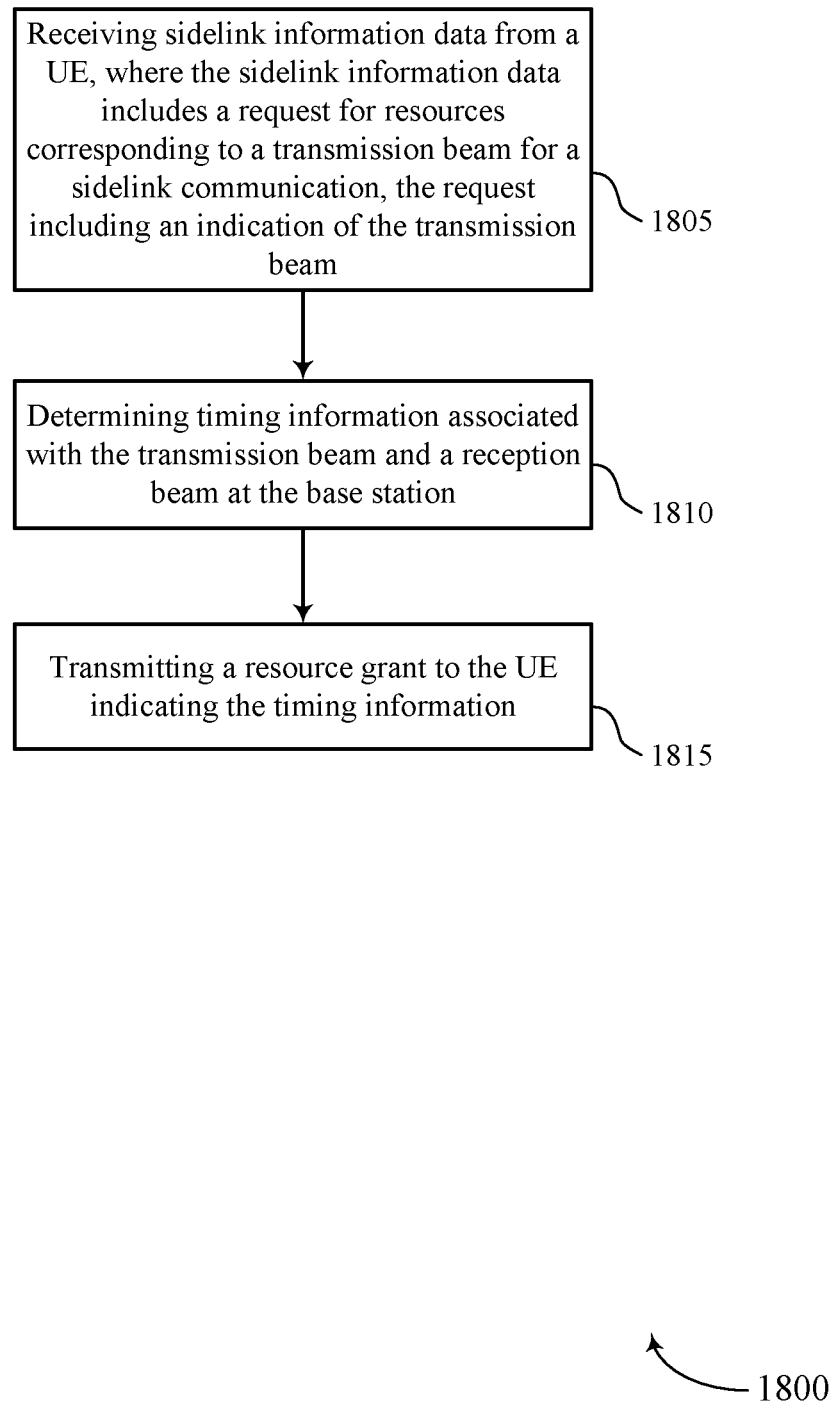

FIG. 18 shows a flowchart illustrating a method 1800 that supports techniques for communicating sidelink transmission timing in accordance with various aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive sidelink information data from a UE, where the sidelink information data includes a request for resources corresponding to a transmission beam for a sidelink communication, the request including an indication of the transmission beam. The operations of 1805 may be performed according to the methods described herein. In some examples, aspects of the operations of 1805 may be performed by a resource request receiving component as described with reference to FIGS. 9 through 12.

At 1810, the base station may determine timing information associated with the transmission beam and a reception beam at the base station. The operations of 1810 may be performed according to the methods described herein. In some examples, aspects of the operations of 1810 may be performed by a scheduler as described with reference to FIGS. 9 through 12.

At 1815, the base station may transmit a resource grant to the UE indicating the timing information. The operations of 1815 may be performed according to the methods described herein. In some examples, aspects of the operations of 1815 may be performed by a grant transmission manager as described with reference to FIGS. 9 through 12.

Figure 19:
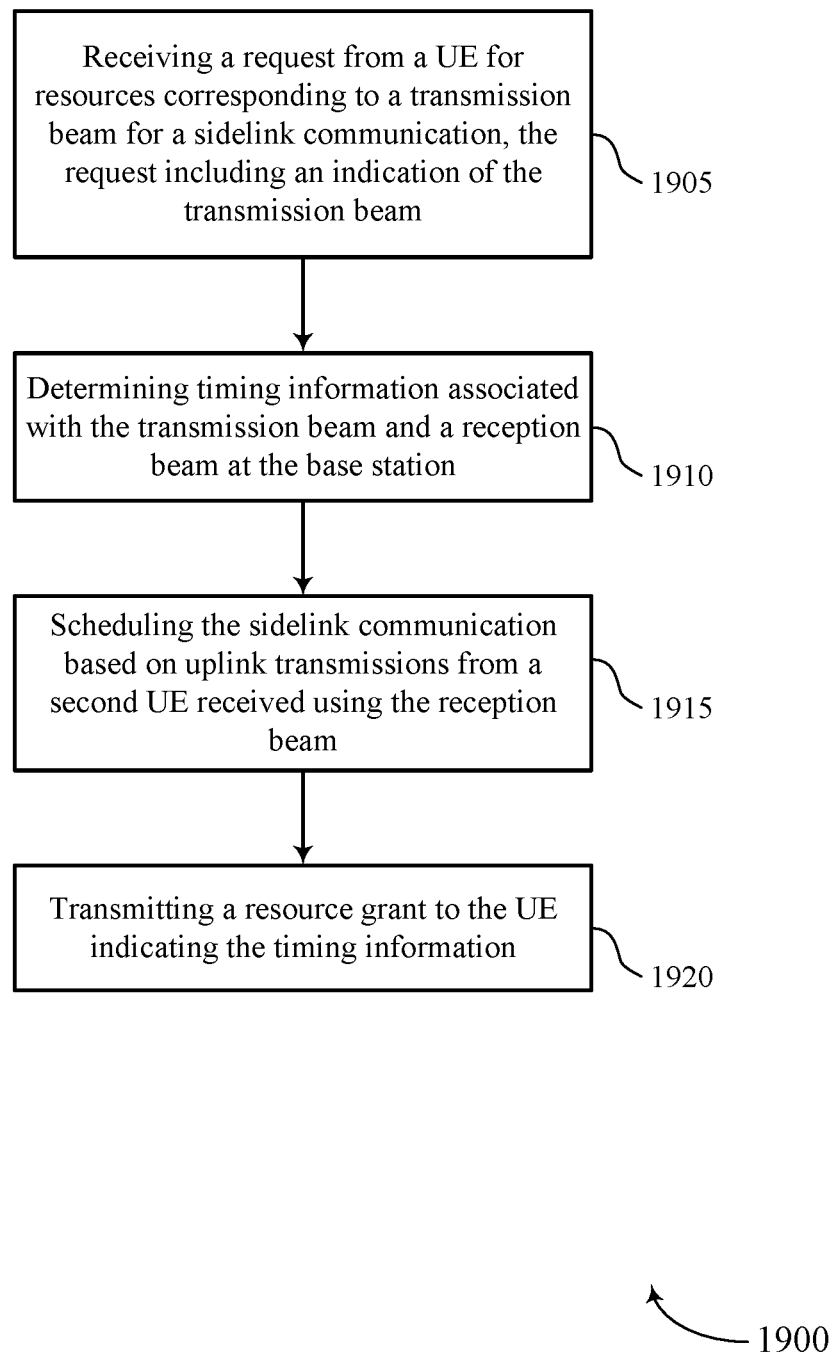

FIG. 19 shows a flowchart illustrating a method 1900 that supports techniques for communicating sidelink transmission timing in accordance with various aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may receive a request from a UE for resources corresponding to a transmission beam for a sidelink communication, the request including an indication of the transmission beam. The operations of 1905 may be performed according to the methods described herein. In some examples, aspects of the operations of 1905 may be performed by a resource request receiving component as described with reference to FIGS. 9 through 12.

At 1910, the base station may determine timing information associated with the transmission beam and a reception beam at the base station. The operations of 1910 may be performed according to the methods described herein. In some examples, aspects of the operations of 1910 may be performed by a scheduler as described with reference to FIGS. 9 through 12.

At 1915, the base station may schedule the sidelink communication based on uplink transmissions from a second UE received using the reception beam. The operations of 1915 may be performed according to the methods described herein. In some examples, aspects of the operations of 1915 may be performed by a scheduler as described with reference to FIGS. 9 through 12.

At 1920, the base station may transmit a resource grant to the UE indicating the timing information. The operations of 1920 may be performed according to the methods described herein. In some examples, aspects of the operations of 1920 may be performed by a grant transmission manager as described with reference to FIGS. 9 through 12.

Figure 20:
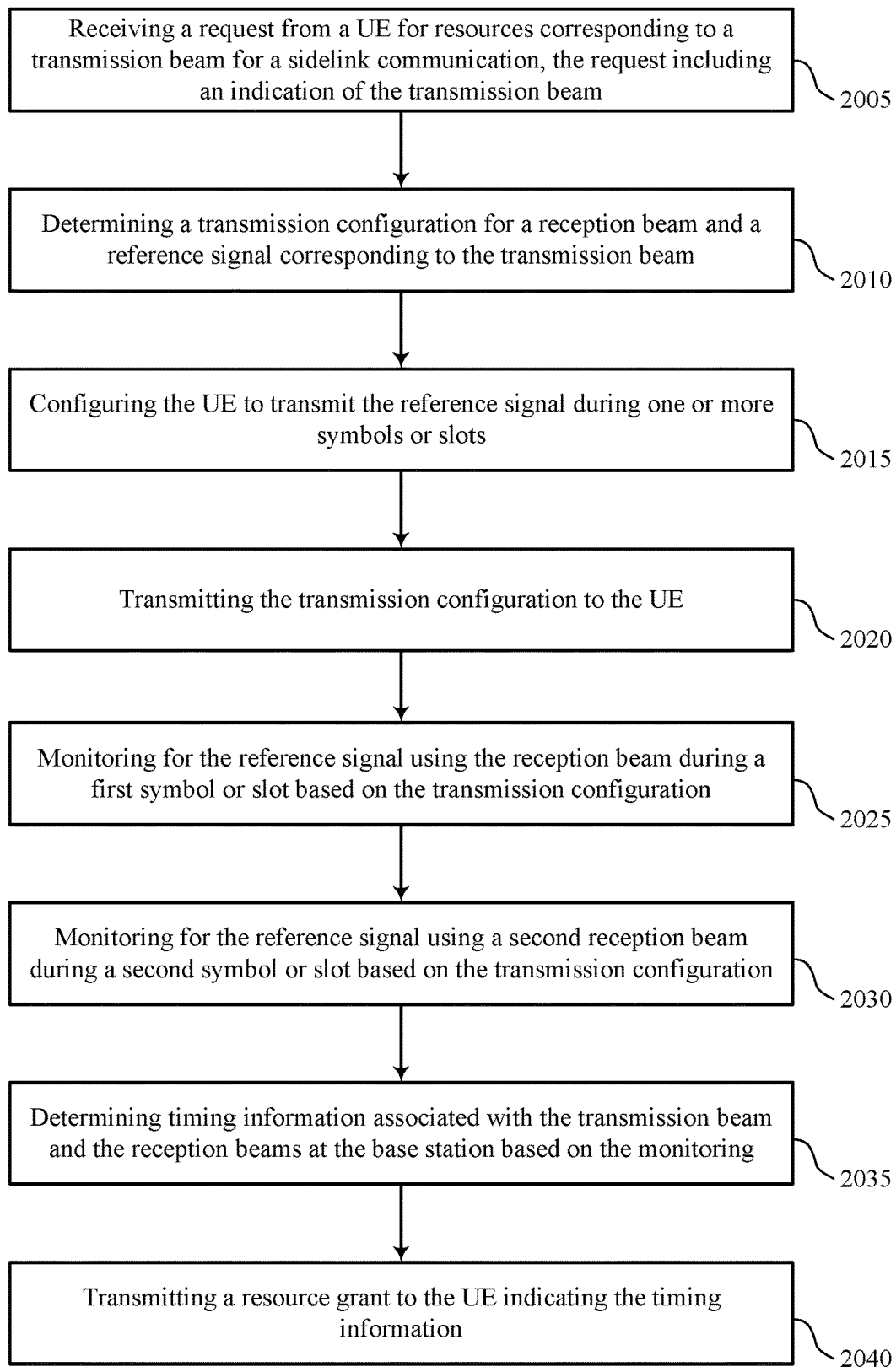

FIG. 20 shows a flowchart illustrating a method 2000 that supports techniques for communicating sidelink transmission timing in accordance with various aspects of the present disclosure. The operations of method 2000 may be implemented by a base station 105 or its components as described herein. For example, the operations of method 2000 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may receive a request from a UE for resources corresponding to a transmission beam for a sidelink communication, the request including an indication of the transmission beam. The operations of 2005 may be performed according to the methods described herein. In some examples, aspects of the operations of 2005 may be performed by a resource request receiving component as described with reference to FIGS. 9 through 12.

At 2010, the base station may determine a transmission configuration for a reception beam and a reference signal corresponding to the transmission beam. The operations of 2010 may be performed according to the methods described herein. In some examples, aspects of the operations of 2010 may be performed by a transmission configuration manager as described with reference to FIGS. 9 through 12.

At 2015, the base station may configure the UE to transmit the reference signal on one or more symbols or slots. The operations of 2015 may be performed according to the methods described herein. In some examples, aspects of the operations of 2015 may be performed by a transmission configuration manager as described with reference to FIGS. 9 through 12.

At 2020, the base station may transmit the transmission configuration to the UE. The operations of 2020 may be performed according to the methods described herein. In some examples, aspects of the operations of 2020 may be performed by a transmission configuration manager as described with reference to FIGS. 9 through 12.

At 2025, the base station may monitor for the reference signal using the reception beam during a first symbol or slot based on the transmission configuration. The operations of 2025 may be performed according to the methods described herein. In some examples, aspects of the operations of 2025 may be performed by a reference signal monitoring component as described with reference to FIGS. 9 through 12.

At 2030, the base station may monitor for the reference signal using a second reception beam during a second symbol or slot based on the transmission configuration. The operations of 2030 may be performed according to the methods described herein. In some examples, aspects of the operations of 2030 may be performed by a reference signal monitoring component as described with reference to FIGS. 9 through 12.

At 2035, the base station may determine timing information associated with the transmission beam and the reception beams at the base station based on the monitoring. The operations of 2035 may be performed according to the methods described herein. In some examples, aspects of the operations of 2035 may be performed by a scheduler as described with reference to FIGS. 9 through 12.

At 2040, the base station may transmit a resource grant to the UE indicating the timing information. The operations of 2040 may be performed according to the methods described herein. In some examples, aspects of the operations of 2040 may be performed by a grant transmission manager as described with reference to FIGS. 9 through 12.

Figure 21:
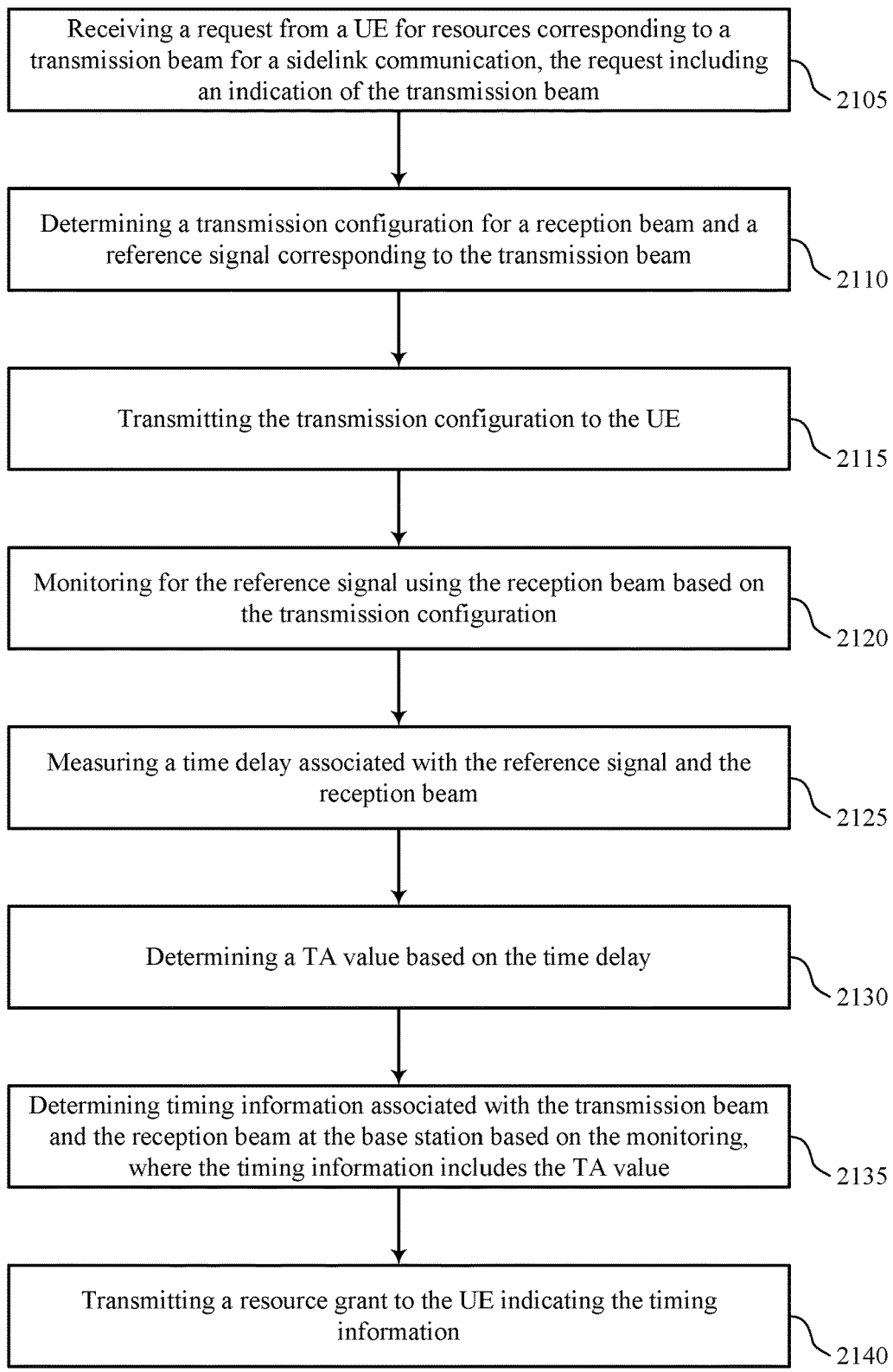

FIG. 21 shows a flowchart illustrating a method 2100 that supports techniques for communicating sidelink transmission timing in accordance with various aspects of the present disclosure. The operations of method 2100 may be implemented by a base station 105 or its components as described herein. For example, the operations of method 2100 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may receive a request from a UE for resources corresponding to a transmission beam for a sidelink communication, the request including an indication of the transmission beam. The operations of 2105 may be performed according to the methods described herein. In some examples, aspects of the operations of 2105 may be performed by a resource request receiving component as described with reference to FIGS. 9 through 12.

At 2110, the base station may determine a transmission configuration for a reception beam and a reference signal corresponding to the transmission beam. The operations of 2110 may be performed according to the methods described herein. In some examples, aspects of the operations of 2110 may be performed by a transmission configuration manager as described with reference to FIGS. 9 through 12.

At 2115, the base station may transmit the transmission configuration to the UE. The operations of 2115 may be performed according to the methods described herein. In some examples, aspects of the operations of 2115 may be performed by a transmission configuration manager as described with reference to FIGS. 9 through 12.

At 2120, the base station may monitor for the reference signal using the reception beam based on the transmission configuration. The operations of 2120 may be performed according to the methods described herein. In some examples, aspects of the operations of 2120 may be performed by a reference signal monitoring component as described with reference to FIGS. 9 through 12.

At 2125, the base station may measure a time delay associated with the reference signal and the reception beam. The operations of 2125 may be performed according to the methods described herein. In some examples, aspects of the operations of 2125 may be performed by a scheduler as described with reference to FIGS. 9 through 12.

At 2130, the base station may determine a TA value based on the time delay. The operations of 2130 may be performed according to the methods described herein. In some examples, aspects of the operations of 2130 may be performed by a scheduler as described with reference to FIGS. 9 through 12.

At 2135, the base station may determine timing information associated with the transmission beam and the reception beam at the base station based on the monitoring, where the timing information includes the TA value. The operations of 2135 may be performed according to the methods described herein. In some examples, aspects of the operations of 2135 may be performed by a scheduler as described with reference to FIGS. 9 through 12.

At 2140, the base station may transmit a resource grant to the UE indicating the timing information. The operations of 2140 may be performed according to the methods described herein. In some examples, aspects of the operations of 2140 may be performed by a grant transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying, at a user equipment (UE), a transmission beam for a sidelink communication;
   transmitting, to an access network entity, a request for resources corresponding to the transmission beam, the request comprising an indication of the transmission beam;
   receiving, from the access network entity, a resource grant indicating timing information associated with the transmission beam, wherein the timing information corresponds to a reception beam at the access network entity, wherein the resource grant further comprises an indication of one or more timing advance values, wherein each timing advance value of the one or more timing advance values is associated with a reception beam of one or more reception beams at the access network entity; and
   performing the sidelink communication using the transmission beam based at least in part on the timing information.

2. The method of claim 1, further comprising:
   transmitting sidelink information data, wherein the sidelink information data comprises the request for the resources.

3. The method of claim 1, further comprising:
   receiving a transmission configuration for a reference signal corresponding to the identified transmission beam; and
   transmitting the reference signal using the transmission beam based at least in part on the transmission configuration.

4. The method of claim 3, wherein the resource grant is based at least in part on the reference signal.

5. The method of claim 3, wherein transmitting the reference signal comprises:
   transmitting the reference signal during one or more symbols or slots based at least in part on the transmission configuration.

6. The method of claim 3, wherein transmitting the reference signal comprises:
   transmitting the reference signal based at least in part on a timing associated with downlink transmissions.

7. The method of claim 3, wherein the reference signal comprises a sounding reference signal.

8. The method of claim 3, wherein the transmission configuration comprises a periodic reference signal configuration, an aperiodic reference signal configuration, a semi-persistent reference signal configuration, or a combination thereof.

9. The method of claim 1, wherein receiving the resource grant comprises:
   receiving the resource grant in downlink control information signaling or a medium access control element.

10. The method of claim 1, wherein the resource grant comprises an indication of an index associated with the timing advance value.

11. The method of claim 1, wherein the timing advance value is zero.

12. The method of claim 11, wherein the resource grant lacks explicit signaling of the timing advance value.

13. The method of claim 12, further comprising:
    determining the timing advance value is zero based at least in part on the lack of explicit signaling in the resource grant.

14. The method of claim 1, further comprising:
    receiving a second resource grant indicating a second timing advance value; and
    performing the sidelink communication based at least in part on a sum of the timing advance value and the second timing advance value.

15. The method of claim 1, wherein the indication of the transmission beam comprises an index.

16. The method of claim 1, wherein the request for the resources comprises a request for a dynamic resource, a request for semi-persistent resources, or a combination thereof.

17. The method of claim 1, wherein the resource grant indicates resources for performing the sidelink communication.

18. The method of claim 1, wherein the sidelink communication comprises a communication from the UE to a receiving device.

19. An apparatus for wireless communications, comprising:
    a processor,
    memory coupled with the processor; and
    instructions stored in the memory and executable by the processor to cause the apparatus to:
    identify, at a user equipment (UE), a transmission beam for a sidelink communication;
    transmit, to an access network entity, a request for resources corresponding to the transmission beam, the request comprising an indication of the transmission beam;
    receive, from the access network entity, a resource grant indicating timing information associated with the transmission beam, wherein the timing information corresponds to a reception beam at the access network entity, wherein the resource grant further comprises an indication of one or more timing advance values, wherein each timing advance value of the one or more timing advance values is associated with a reception beam of one or more reception beams at the access network entity; and perform the sidelink communication using the transmission beam based at least in part on the timing information.

20. The apparatus of claim 19, wherein the instructions are further executable by the processor to cause the apparatus to:

transmit sidelink information data, wherein the sidelink information data comprises the request for the resources.

21. The apparatus of claim 19, wherein the instructions are further executable by the processor to cause the apparatus to:

receive a transmission configuration for a reference signal corresponding to the identified transmission beam; and transmit the reference signal using the transmission beam based at least in part on the transmission configuration.

22. The apparatus of claim 21, wherein the instructions are further executable by the processor to cause the apparatus to:

transmit the reference signal during one or more symbols or slots based at least in part on the transmission configuration.

23. The apparatus of claim 21, wherein the instructions are further executable by the processor to cause the apparatus to:

transmit the reference signal based at least in part on a timing associated with downlink transmissions.

24. The apparatus of claim 19, wherein the instructions are further executable by the processor to cause the apparatus to:

receive the resource grant in downlink control information signaling or a medium access control element.

25. An apparatus for wireless communications, comprising:

means for identifying, at a user equipment (UE), a transmission beam for a sidelink communication;

means for transmitting, to an access network entity, a request for resources corresponding to the transmission beam, the request comprising an indication of the transmission beam;

means for receiving, from the access network entity, a resource grant indicating timing information associated with the transmission beam, wherein the timing information corresponds to a reception beam at the access network entity, wherein the resource grant further comprises an indication of one or more timing advance values, wherein each timing advance value of the one or more timing advance values is associated with a reception beam of one or more reception beams at the access network entity; and means for performing the sidelink communication using the transmission beam based at least in part on the timing information.

26. A non-transitory computer-readable medium storing code for wireless communications, the code comprising instructions executable by a processor to:

identify, at a user equipment (UE), a transmission beam for a sidelink communication;

transmit, to an access network entity, a request for resources corresponding to the transmission beam, the request comprising an indication of the transmission beam;

receive, from the access network entity, a resource grant indicating timing information associated with the transmission beam, wherein the timing information corresponds to a reception beam at the access network entity, wherein the resource grant further comprises an indication of one or more timing advance values, wherein each timing advance value of the one or more timing advance values is associated with a reception beam of one or more reception beams at the access network entity; and perform the sidelink communication using the transmission beam based at least in part on the timing information.

* * * * *